(12) United States Patent
Yamamoto et al.

(10) Patent No.: US 11,467,907 B2
(45) Date of Patent: Oct. 11, 2022

(54) STORAGE SYSTEM WITH MULTIPLE STORAGE DEVICES TO STORE DATA

(71) Applicant: Hitachi, Ltd., Tokyo (JP)

(72) Inventors: Takahiro Yamamoto, Tokyo (JP); Akira Yamamoto, Tokyo (JP); Masakuni Agetsuma, Tokyo (JP); Yoshinori Ohira, Tokyo (JP); Hiroto Ebara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 17/018,322

(22) Filed: Sep. 11, 2020

(65) Prior Publication Data

US 2021/0200639 A1 Jul. 1, 2021

(30) Foreign Application Priority Data

Dec. 26, 2019 (JP) .............................. JP2019-237236

(51) Int. Cl.
| | |
|---|---|
| *G06F 11/10* | (2006.01) |
| *G06F 11/07* | (2006.01) |
| *G06F 11/30* | (2006.01) |
| *G06F 9/48* | (2006.01) |
| *G06F 3/06* | (2006.01) |

(52) U.S. Cl.
CPC .......... *G06F 11/1092* (2013.01); *G06F 3/067* (2013.01); *G06F 3/0619* (2013.01); *G06F 3/0659* (2013.01); *G06F 3/0689* (2013.01); *G06F 9/4881* (2013.01); *G06F 11/0772* (2013.01); *G06F 11/3034* (2013.01)

(58) Field of Classification Search
CPC ............ G06F 11/0772; G06F 11/1092; G06F 11/3034; G06F 11/3419; G06F 3/0659; G06F 3/067
See application file for complete search history.

(56) References Cited

U.S. PATENT DOCUMENTS

| | | | |
|---|---|---|---|
| 8,285,952 B2 * | 10/2012 | Arakawa | G06F 3/0653 711/158 |
| 9,697,081 B2 * | 7/2017 | Miyamae | G06F 11/1084 |
| 2011/0066803 A1 | 3/2011 | Arakawa et al. | |
| 2019/0146875 A1 * | 5/2019 | Harrington | G06F 11/1092 714/6.24 |

\* cited by examiner

*Primary Examiner* — Nadeem Iqbal
(74) *Attorney, Agent, or Firm* — Baker Botts L.L.P.

(57) ABSTRACT

This invention provides a storage system enabling it to properly rebuild a storage device involved in failure. In the storage system, a controller repairs data for which an access request has been issued, returns a reply to the source of the access request, and stores the repaired data. As regards data for which access is not requested, the controller executes rebuilding of storage regions corresponding to rebuild management units in priority-based order and changes priority for executing the rebuilding, based on access frequencies for a first period and access frequencies for a second period that is shorter than the first period.

6 Claims, 28 Drawing Sheets

FIG. 6

STORAGE POOL MANAGEMENT TABLE — 412

STORAGE POOL INFORMATION TABLE — 610

| STORAGE POOL NO. | TOTAL SPACE (BLOCKS) | CONSUMED SPACE (BLOCKS) |
|---|---|---|
| 0 | 0x3A8C36096 | 0xEA30D8258 |
| 1 | ... | ... |

611 — 612 — 613

VIRTUAL VOLUME MANAGEMENT TABLE — 620

| VIRTUAL VOLUME NO. | SIZE (BLOCKS) | STORAGE POOL NO. |
|---|---|---|
| 0 | 0x21210000 | 0 |
| 1 | 0x12301200 | 2 |
| 2 | 0x42123000 | 0 |

621 — 622 — 623

PAGE MAPPING TABLE — 630

| PAGE NO. | VIRTUAL VOLUME NO. | LBA | SIZE (BLOCKS) | LOGICAL CHUNK NO. | LBA |
|---|---|---|---|---|---|
| 0 | 0 | 0x00000000 | 0x2000 | 0 | 0x000000 |
| 1 | 1 | 0x00000000 | 0x2000 | 0 | 0xC00000 |
| 2 | 2 | 0x06400000 | 0x2000 | 1 | 0x800000 |
| ... | ... | ... | ... | ... | ... |

PARITY GROUP MANAGEMENT TABLE

710 — LOGICAL CHUNK MANAGEMENT TABLE

| LOGICAL CHUNK NO. | SIZE (BLOCKS) | PARITY GROUP NO. |
|---|---|---|
| 0 | 0x8400000 | 0 |
| 1 | 0x8400000 | 2 |
| 2 | 0x8400000 | 1 |

711　712　713

720 — PARITY GROUP MANAGEMENT TABLE

| PARITY GROUP NO. | DATA PROTECTION SETUP | PHYSICAL CHUNK NO. |
|---|---|---|
| 0 | MIRROR | 0, 1 |
| 1 | 3D1P | 2, 8, 3, 5 |
| 2 | 4D1P | 4, 6, 7, 9, 10 |

721　722　723

730 — PHYSICAL CHUNK MANAGEMENT TABLE

| PHYSICAL CHUNK NO. | STARTING OFFSET | SIZE (BLOCKS) | SITE NO. NODE NO. DRIVE NO. |
|---|---|---|---|
| 0 | 0x00000000 | 0xC800000 | 0 / 0 / 0 |
| 1 | 0x0C800000 | 0xC800000 | 0 / 1 / 2 |
| 2 | 0x00000000 | 0xC800000 | 1 / 3 / 0 |

CACHE GROUP MANAGEMENT TABLE — 414, 810

CACHE ORGANIZATION MANAGEMENT TABLE

| CACHE SEGMENT NO. | TYPE | SIZE (BLOCKS) | DEVICE NO. | STARTING OFFSET |
|---|---|---|---|---|
| 0 | MEMORY | 0x01400000 | NULL | 0x00A00000 |
| 1 | DRIVE | 0x0C800000 | 0 | 0x0C800000 |
| 2 | DRIVE | 0x0C800000 | 3 | 0x19000000 |

811　812　813　814　815

FREE CACHE MANAGEMENT TABLE — 820

| CACHE SEGMENT NO. | FREE ENTRY |
|---|---|
| 0 | OFFSET: 0x000 → 0x200 → 0x400 ... / SIZE: 0x200, 0x080, 0x200 |
| 1 | OFFSET: 0x000 → 0x200 → 0x400 ... / SIZE: 0x200, 0x080, 0x200 |
| 2 | ... |

821　822

CACHE INFORMATION MANAGEMENT TABLE — 830

| VIRTUAL VOLUME NO. | LBA | CACHE SEGMENT NO. | ENTRY INFORMATION |
|---|---|---|---|
| 0 | 0x00000000 | 0 | OFFSET 0x800 / SIZE 0x200 |
| 0 | 0x06400000 | 1 | OFFSET 0x600 / SIZE 0x080 |
| 1 | 0x00000000 | 2 | OFFSET 0x000 / SIZE 0x200 |

MONITOR MANAGEMENT TABLE — 910

LONG-PERIOD MONITORING INFORMATION TABLE

| PAGE NO. | READ COUNTER | WRITE COUNTER | MONITORING START TIME | FIXED VALUE OF ACCESS FREQUENCY |
|---|---|---|---|---|
| 0 | 1200 | 20 | 2019/5/21 12:30:45 | 1500 |
| 1 | 59 | 100 | 2019/5/21 12:31:30 | 200 |
| 2 | 250 | 200 | 2019/5/20 21:00:24 | 310 |
| ... | ... | ... | ... | ... |

911　912　913　914　915

SHORT-PERIOD MONITORING INFORMATION TABLE — 920

| PAGE NO. | READ COUNTER | WRITE COUNTER | MONITORING START TIME | TIME OF LAST ACCESS | FIXED VALUE OF ACCESS FREQUENCY |
|---|---|---|---|---|---|
| 0 | 5 | 14 | 2019/5/22 09:15:50 | 2019/5/22 09:17:50 | 20 |
| 1 | 50 | 12 | 2019/5/22 08:45:10 | 2019/5/22 08:51:12 | 100 |
| 2 | 18 | 32 | 2019/5/22 10:00:36 | 2019/5/22 10:01:00 | 2000 |
| ... | ... | ... | ... | ... | ... |

921　922　923　924　925　926

FREQUENCY DISTRIBUTION TABLE — 930

| POOL NO. | LOAD LEVEL (IOPS) | NUMBER OF PAGES | PAGE NO. LIST |
|---|---|---|---|
| 1 | 0 (0) | 4590 | 896, 74, 680, ... |
|  | 1 (10) | 2580 | 56, 365, ... |
|  | 2 (100) | 512 | 1056, 8, ... |
|  | 3 (1000) | 128 | 125, 254, ... |
|  | 4 (10000) | 56 | 0, 3, 4, ... |
| 2 | 0 (0) | 1160 | 960, 552, ... |
|  | ... | ... | ... |

931　932　933　934

415

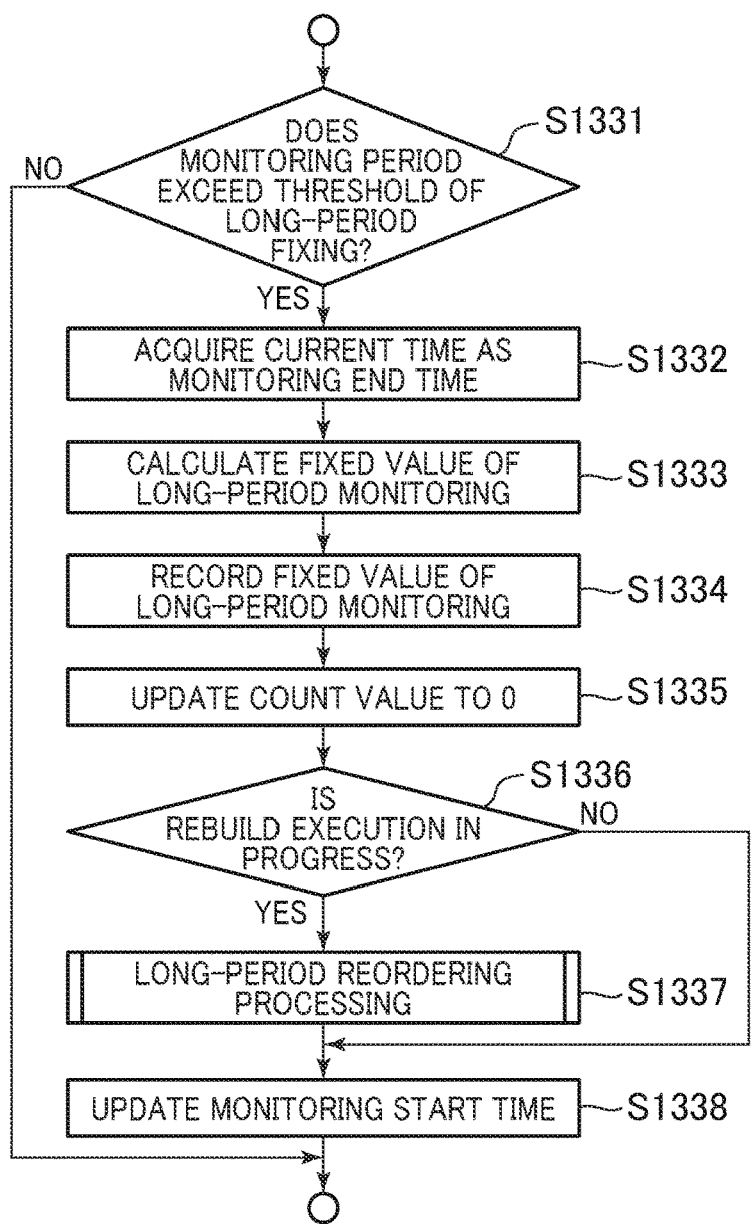

FIG. 17
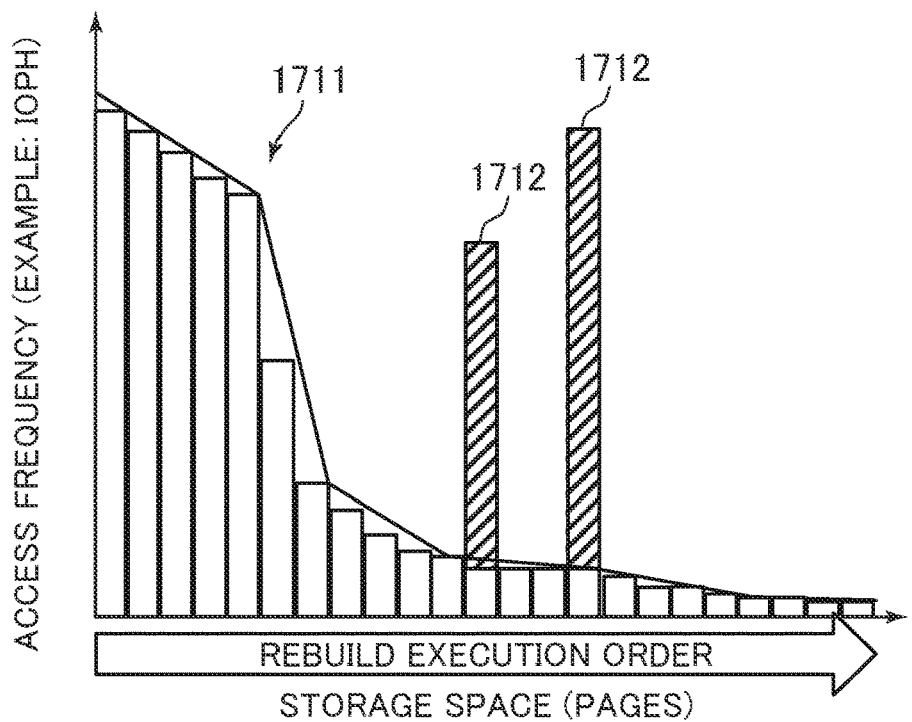
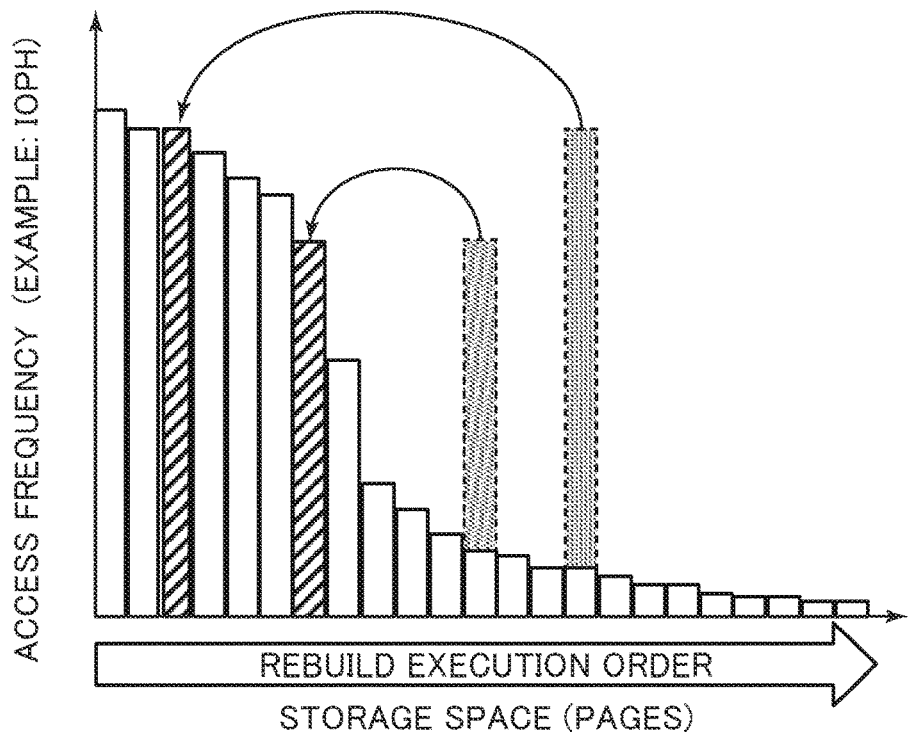

REBUILD SETUP
- LONG-PERIOD MODE 1811 — ON ▼
- SHORT-PERIOD MODE 1812 — ON ▼

SHORT-PERIOD DETAILED SETUP
- PRIORITY DETERMINING ALGORITHM: 1813 — MONITORING COMPARISON MODE ▼
  - ACCESS ORDER MODE
  - PIGGYBACK MODE
- MONITORING FIXING COUNTER VALUE: 1814 — 32
- PRIORITY ORDERING THRESHOLD: 1815 — 0

- WHAT IS MONITORED: 1816 — READ / WRITE ▼
  - READ ONLY
  - WRITE ONLY

- PRIORITY LEVEL: 1817 — 1 ▼

VIRTUAL VOLUME SETUP
- VIRTUAL VOLUME NO.: 1
- PREFERENTIAL RECOVERY: 1821 — ON ▼

PREFERENTIAL RECOVERY DETAILED SETUP

PREFERENTIAL RECOVERY REGION SETUP [DELETE]
- STARTING OFFSET: 1822 — 0x00001000 ▼
- SIZE: 1823 — 100 GB ▼
- PRIORITY LEVEL: 1824 — 0 ▼

[ADD] — 1825

STORAGE SYSTEM WITH MULTIPLE STORAGE DEVICES TO STORE DATA

BACKGROUND

The present invention relates to a storage system and is favorably suited for application to a storage system adapted to perform rebuilding.

Users design a system, taking an event of failure into consideration, so that failure, if occurs, in a storage system, does not affect services. If it is foreseen that failure causes a large decrease in performance, a lot of surplus hardware should be prepared and the cost for introduction and operation increases.

As methods for protecting data from failure, for example, a mirroring method (RAID1) and a distributed parity method (RAID5/6) exist.

If failure should occur, the mirroring method allows for simply reading data and returning the data as a reply to a host device and, therefore, there is less influence causing a decrease in performance. However, its defect is low space efficiency.

On the other hand, if the distributed parity method is used to protect data, it provides higher space efficiency than the mirroring method. However, its defect is making storage system performance lower in comparison with the mirroring method, since data repair processing (correction access) is necessary when a failed portion is accessed.

In this respect, a technical approach is disclosed that is outlined below: with regard to virtual volumes provided from a Thin-pro pool, priority ordering is performed for regions to which pages have been allocated and regions to which pages are not allocated; then, priority ordering is performed for the regions to which pages have been allocated from information of per-region access frequency acquired in advance by monitoring; and rebuilding is performed according to the priority-based order (refer to the specification of US patent application publication No. 2011/66803).

SUMMARY

In the technical approach described in the specification of US patent application publication No. 2011/66803, priority ordering is performed for regions to rebuild based on access frequency determined in advance by a result of monitoring for a given period. Accordingly, if an I/O pattern (spatial access locality) has changed unexpectedly after start of rebuilding, it is impossible for this approach to effectively prioritize a region, access to which becomes more frequently in response to the changed I/O pattern. Consequently, there is a possibility of prolonging a period during which storage system performance decreases, affected by failure.

The present invention has been developed in consideration of the above discussed point and is intended to propose a storage system enabling it to rebuild a storage device involved in failure properly.

According to an aspect of the present invention to solve a problem discussed above, a storage system adapted to perform rebuilding includes multiple storage devices to store data and a controller to process data that is input to or output from the storage devices. When failure has occurred in one of the storage devices, the controller repairs data stored in a storage device in which the failure has occurred, based on data and redundant data stored in other multiple storage devices. The controller repairs data for which an access request has been issued, returns a reply to the source of the access request, and stores the repaired data. As regards data for which access is not requested, the controller executes rebuilding of storage regions corresponding to rebuild management units in priority-based order. The controller changes priority for executing the rebuilding, based on access frequencies for a first period and access frequencies for a second period that is shorter than the first period.

In the above configuration, because priority for executing rebuilding is changed based on access frequencies for a first period and access frequencies for a second period that is shorter than the first period, it is possible to, e.g., change rebuild ordering in response to an unexpected change occurring in I/O processing operations and execute rebuilding. By thus changing rebuild ordering, it is possible to avoid a situation where the storage system performance decreases because of improper rebuild ordering.

According to the present invention, it is possible to implement a highly reliable storage system.

BRIEF DESCRIPTION OF THE DRAWINGS

FIG. 6 is a diagram presenting an example of a storage pool management table according to the first embodiment.

FIG. 7 is a diagram presenting an example of a parity group management table according to the first embodiment.

FIG. 8 is a diagram presenting an example of a cache group management table according to the first embodiment.

FIG. 9 is a diagram presenting an example of a monitor management table according to the first embodiment.

FIG. 13C is a diagram illustrating an example of a flowchart about long-period monitoring update processing according to the first embodiment.

FIG. 13D is a diagram illustrating an example of a flowchart about long-period monitoring fixing processing according to the first embodiment.

FIG. 17 is a diagram to explain reordering a rebuild order according to the first embodiment.

FIG. 18A is a diagram presenting an example of a setup screen according to the first embodiment.

FIG. 18B is a diagram presenting an example of a setup screen according to the first embodiment.

DETAILED DESCRIPTION

Figure 1:
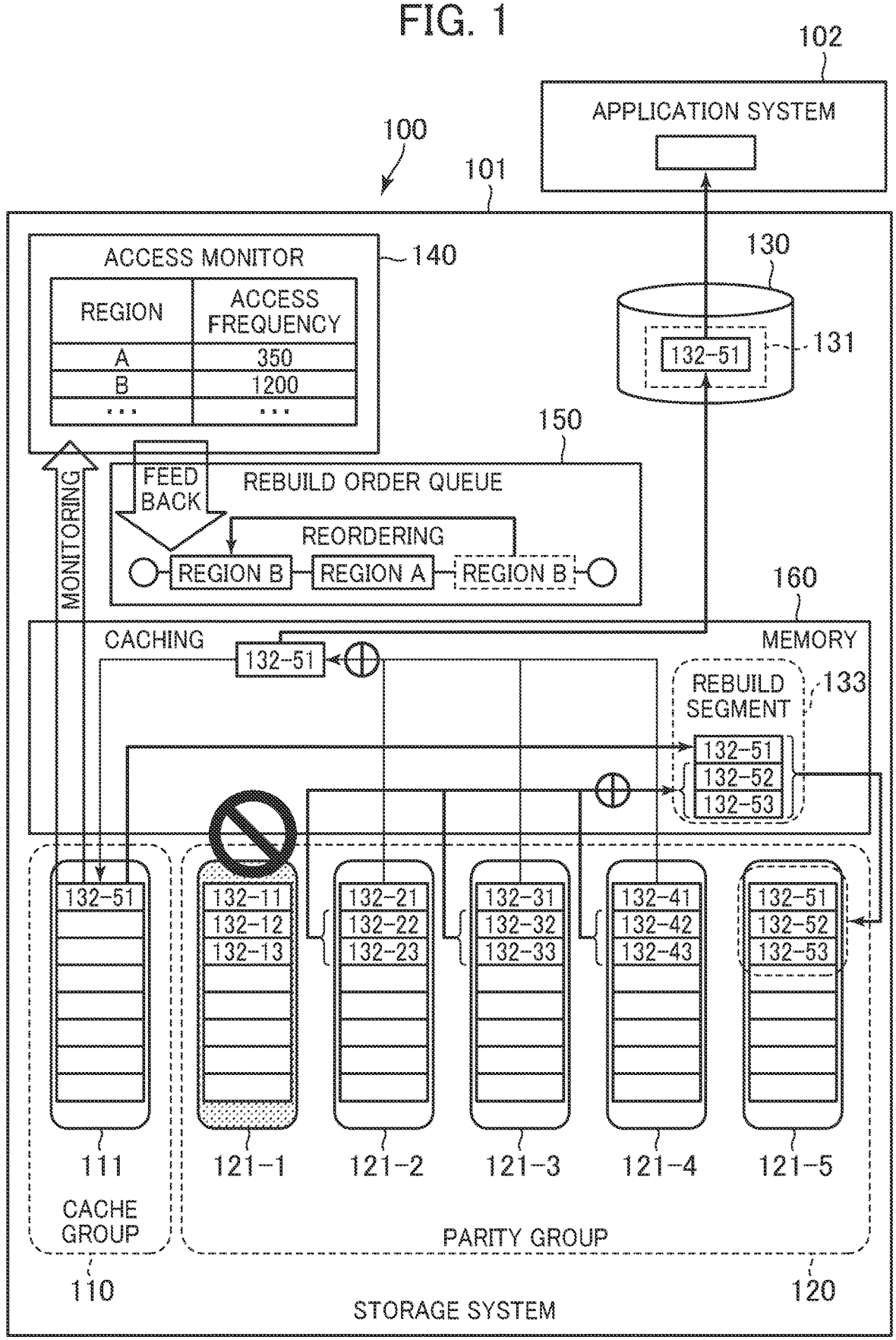
FIG. 1 is a diagram depicting an example of a configuration regarding a computer system according to a first embodiment.

In the following, an embodiment of the present invention will be detailed in connection with the drawings.

Note that, in the following description, a reference numeral without a sub-number may commonly be used when identical elements are mentioned without individuating them, whereas a reference numeral with a sub-number may be used when the identical elements are mentioned, individuating them. For example, there may be written down "physical segments 121" when mentioning the physical segments without individuating them specifically, whereas there may be written down a "physical segment 121-1", a "physical segment 121-2", and the like when mentioning them, individuating the respective segments.

(1) First Embodiment

In FIG. 1, a reference numeral 100 denotes a computer system as a whole according to a first embodiment.

FIG. 1 is a diagram depicting an example of a configuration regarding the computer system 100. The computer system is configured including a storage system 101 and an application system 102. The storage system 101 and the application system 102 are connected so that they can communicate with each other.

In the storage system 101, a cache group 110 is formed using one or more physical segments 111 (those reserved, e.g., inter alia, in a memory 212 and/or on a drive 214 which will be described later) and a parity group 120 is formed using one or more physical segments 121 (those reserved, e.g., inter alia, on a drive 214 which will be described later). Note that the physical segments 121 of the parity group 120 may be distributed across multiple nodes 210 (server computers) which will be described later or assembled within a box of drives connectable from multiple processor packages 213 which will be described later.

With respect to each given region 131 in a virtual volume 130 that is provided to the application system, the storage system 101 monitors the frequency (access frequency) at which the region 131 has been accessed (to read data from and/or write data to the region). Note that the given region 131 may be any of the following: a page 331 which will be described later, a target region to rebuild (a rebuild segment) 133, a block containing data pieces, and one of other chunks.

The storage system manages monitored results as access monitor information 140. Also, the storage system is provided with a queue 150 for managing priority among regions 131 to restore in case failure should occur as entries in units of regions 131. In response to receiving a data processing request from the application system 102 (based on an update to the access monitor information 140), the storage system 101 reorders the entries in the queue in descending order of the access frequency and executes rebuilding for each of target regions to rebuild (rebuild segments) 133 which are units in which to manage rebuilding (rebuild management units) according to the updated queue 150.

With FIG. 1, an overview of the storage system 101 is described, taking an example case in which, when failure occurs in a physical segment 121-1 and data restoring (rebuilding) is being performed, a data piece 132-11 stored in the physical segment 121-1 is read (referenced) from the application system.

Upon receiving a data processing request from the application system, the storage system 101 reads data pieces 132-21, 132-31, and 132-41 from physical segments 121-2, 121-3, and 121-4 respectively to restore the data piece 132-11 and generates a data piece 132-51 resulting from restoring the data piece 132-11. In the following, a restored data piece may be referred to as a "repaired data piece".

The storage system 101 stores the generated data piece 132-51 into the physical segment 111 of the cache group 110. Besides, the storage system monitors the physical segment 111 of the cache group 110 and, within the access monitor information 140, updates the access frequency of the region 131 associated with the target data piece 132-11 to read in the virtual volume 130.

In execution of rebuilding with the data piece 132-51, the storage system 101 also generates data pieces 132-52 and 135-53 to be included in the target region to rebuild (rebuild segment) 133. More specifically, the storage system 101 reads data pieces 132-22, 132-32, 132-42 from the physical segments 121-2, 121-3, and 121-4 respectively and generates a data piece 132-52 resulting from restoring a data piece 132-12. Also, the storage system 101 reads data pieces 132-23, 132-33, and 132-43 from the physical segments 121-2, 121-3, and 121-4 respectively and generates a data piece 132-53 resulting from restoring a data piece 132-13.

Then, the storage system 101 reads the data piece 132-51 once stored in the physical segment 111 of the cache group 110 and stores the read data piece 132-51 as well as the generated data pieces 132-52 and 132-53 collectively into a physical segment 121-5 that is a destination to store rebuilt data.

Note that part or all of the application system 102 may be configured to be included in the storage system 101.

Figure 2:
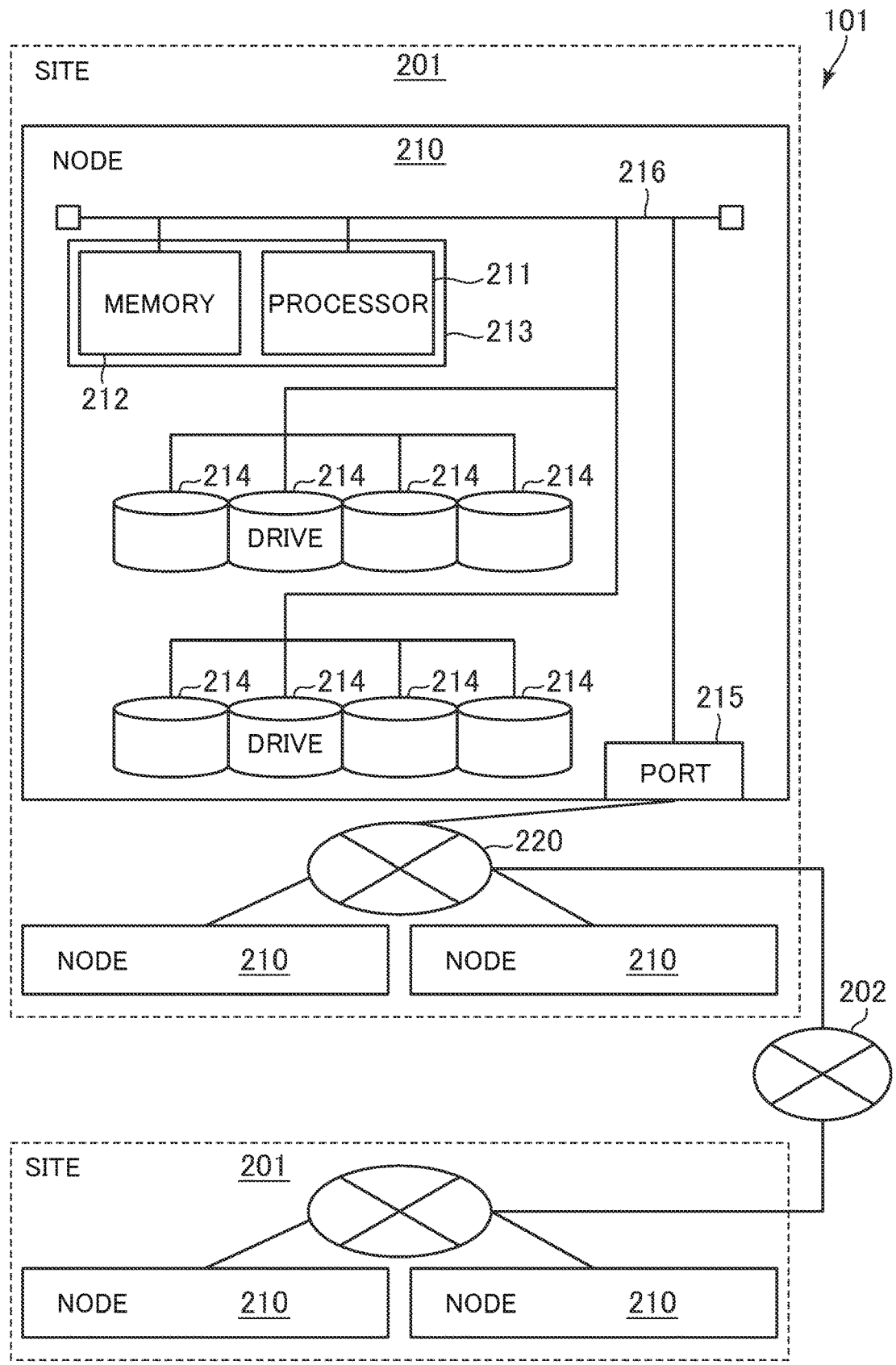
FIG. 2 is a diagram depicting an example of a physical configuration regarding a storage system according to the first embodiment.

FIG. 2 is a diagram depicting an example of a physical configuration regarding the storage system 101.

One or more sites 201 may be provided in the storage system 101. Respective sites 201 are connected via a network 202 so that they can communicate with each other. The network 202 is, but not limited to, e.g., a Wide Area Network (WAN).

Each site 201 is a data center or the like and is configured including one or more nodes 210.

Each node 210 may have a configuration of a commonly used server computer. The node 210 is configured including one or more processor packages 123 that each include a processor 211, a memory 212, etc., one or more drives 214, and one or more ports 215. Every component is interconnected via an internal bus 216.

The processor 211 is, for example, a Central Processing Unit (CPU) and performs various kinds of processing.

The memory 212 stores information for control required for implementing functions of the node 210 and also stores data. The memory 212 also stores programs that are, for example, executed by the processor 211. The memory 212 may be a volatile Dynamic Random Access Memory (DRAM), a nonvolatile Storage Class Memory (SCM), or any other storage device.

Each drive 214 stores diverse kinds of data, programs, etc. The drive 214 may be a Hard Disk Drive (HDD) or a Solid State Drive (SSD) which is connected on Serial Attached SCSI (SAS) or Serial Advanced Technology Attachment (SATA) or an SSD which is connected on Non-Volatile Memory Express (NVMe); besides, it may be SCM or the like. The drive 214 is an example of a storage device.

Each port 215 is connected to the network 220 so that one node can communicate with another node 210 within the site 201. The network 220 is, but not limited to, e.g., a Local Area Network (LAN).

The physical configuration regarding the storage system 101 is not limited to that described above. For example, the networks 202 and 220 may be made redundant. For example, the network 220 may be separated into a network for management and a network for storage. Connection standards may be Ethernet (a registered trademark), Infiniband, or wireless and the connection topology is not limited to the configuration depicted in FIG. 2.

Figure 3:
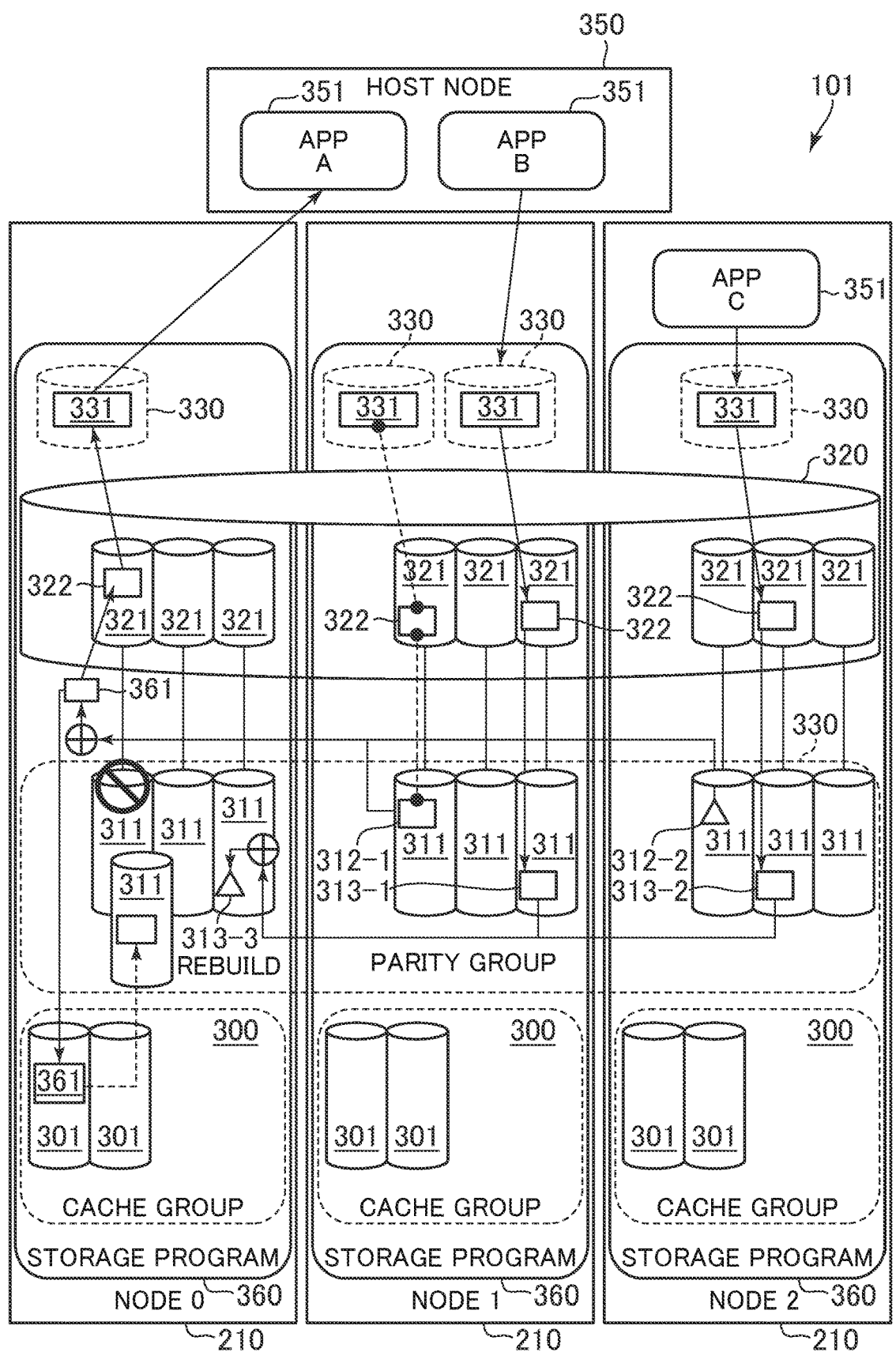
FIG. 3 is a diagram depicting an example of a logical configuration regarding the storage system according to the first embodiment.

FIG. 3 is a diagram depicting an example of a logical configuration regarding the storage system 101.

Each node 210 is provided with a storage program 360. The storage program 360 configures a cache group 300. The cache group 300 is a group for temporarily storing (caching) data and includes one or more cache segments 301. The cache segments 301 are a series of segments corresponding to all or a subset of physical segments present in the memory 212 and physical segments present in a drive 214. In the following, data written to the cache segments 301 is referred to as "cached data".

Besides, the storage program 360 configures a parity group 310. The parity group 310 is comprised of physical chunks 311 in drives 214 on multiple nodes 210. The parity group 310 is a group that protects data pieces distributed across multiple nodes 210. For example, if a data protection policy is 2DIP, a parity group 310 is comprised of three physical chunks reserved from drives 214 on different nodes 210. As data protection policies, the following exist: duplication, Erasure Coding (EC), Multi-stage Erasure Coding (MEC), etc. The physical chunks 311 are a series of segments corresponding to all or a subset of physical segments present in drives 214. The physical chunks 311 are configured including physical segments that store data (data segments) and physical segments that store parity (parity segments). Parity is redundant code for decoding data from failure.

In FIG. 3, an example is presented in which one stripe is formed of a data piece 313-1, a data piece 313-2, and a parity piece 313-3. It is also presented that, if a request for a data piece on a node 210 in which failure has occurred has been issued from an application 351 on a host node 350, a repaired data piece 361 is generated from a data piece 312-1 and a parity piece 312-2 that form the same stripe with the data piece, then stored into a cache segment 301, and returned to the application 351. When the application 351 on the host node 350 will read the repaired data piece 361 next time and subsequent times, the storage program 360 will return the data piece 361 stored in the cache without executing data repair processing. This reduces the overhead of reading data on the node 210 in which failure has occurred second time and subsequent times and improves throughput and response.

Logical chunks 321 are separated out from a parity group 310. The logical chunks 321 are units in which a space is to be allocated to a storage pool 320 on each node 210 and segments corresponding to data segments excepting parity segments. Either one logical chunk 321 or multiple logical chunks 321 may be separated out from one parity group 310.

Also, the storage program 360 configures a storage pool 320. The storage pool 320 is configured including multiple logical chunks 321 and virtualizes the spaces in the entire storage system 100. From the storage pool 320, a virtual volume 330 that is used by an application 351 is separated out. That is, the storage program 360 allocates a space according to a request by a user as a virtual volume 330 without allocating it to a drive 214.

For instance, upon having received a write processing request from an application 351, when the request is for a new write, the storage program 360 allocates a page 331 in a virtual volume 330 (more particularly, the physical segment of a physical chunk 311 associated with the page 331). Note that a page 322 in the storage pool 320 is mapped to the page 331. When the request is for an update write, the storage program 360 finds out the physical segment of the physical chunk 311 associated with the allocated page 331 and updates the data piece in the physical segment. Note that data of the write processing request (or intermediate data which will be described later) is transferred to another node 210 engaged in data redundancy to update parity.

In this way, the storage program 360 manages drives 214 as a shared storage pool 320 and allocates a space to a drive 214 according to an amount of data written to a virtual volume 330. Thereby, efficient operation is performed, eliminating waste of drives 214 remaining unused.

Note that an application 351 that accesses data may be provided and run on the host node 350, provided and run on the same node 210 that the storage program 360 runs on, or provided and run on another node 210. Also, the destination to store rebuilt data may be a physical segment within or outside a node 210 in which failure has occurred.

Figure 4:
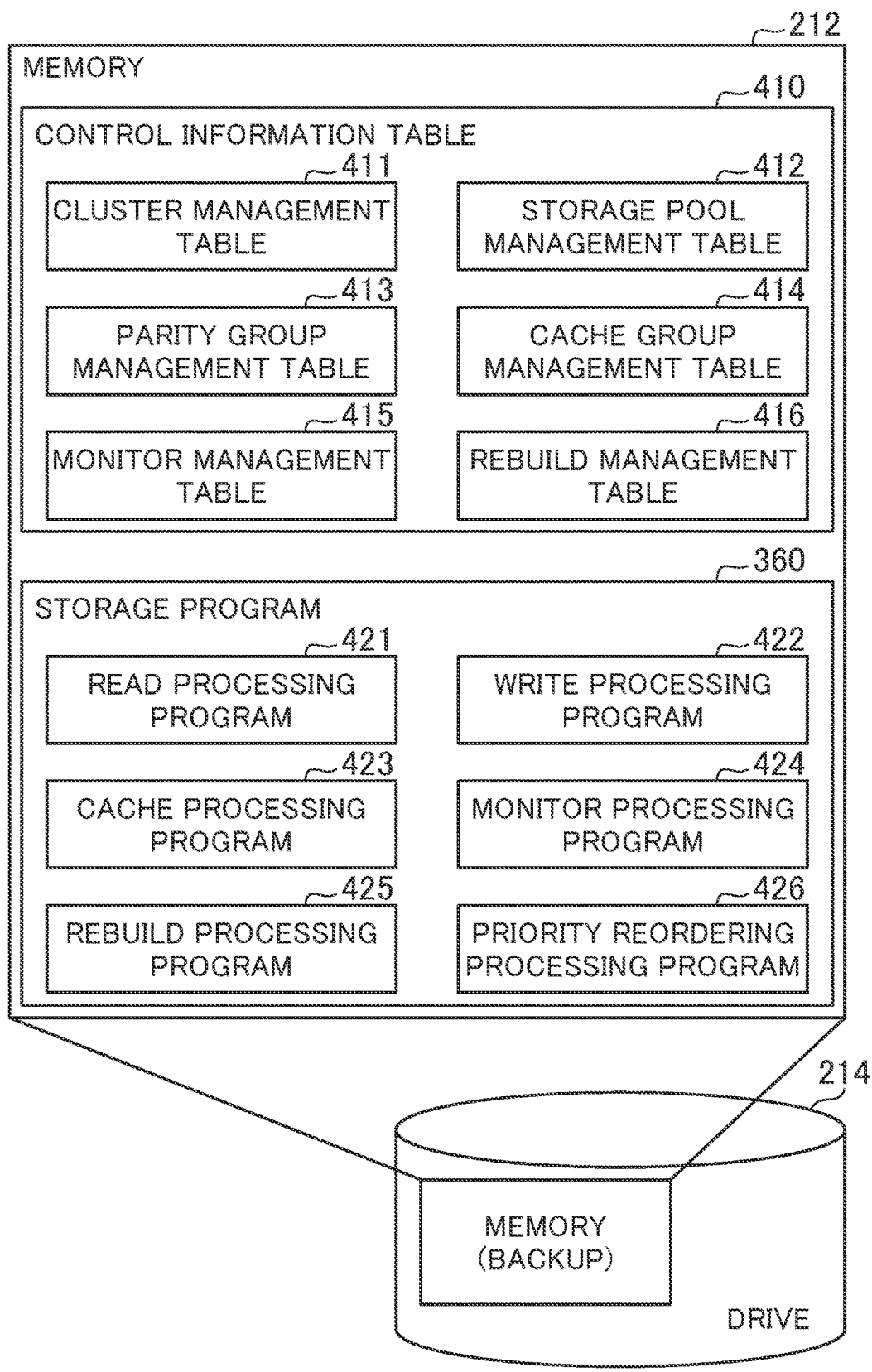
FIG. 4 is a diagram depicting an example of information within a memory according to the first embodiment.

FIG. 4 is a diagram depicting an example of information within the memory 212 (information that is read from a drive 214 to the memory 212). Note that a control information table 410 and diverse programs (those in a storage program 360) are loaded into the memory 212 when they are executed and, however, they are stored in nonvolatile areas in drives 214 or the like in case of electric power interruption or the like.

In the control information table 410, the following ones are included: a cluster management table 411, a storage pool management table 412, a parity group management table 413, a cache group management table 414, a monitor management table 415, and rebuild management table 416. Each table will be described in detail about each page later, using FIGS. 5 thru 10.

The storage program 360 includes a read processing program 421, a write processing program 422, a cache processing program 423, a monitor processing program 424, a rebuild processing program 425, and a priority reordering processing program 426.

Functions of a node 210 (such as the read processing program 421, write processing program 422, cache processing program 423, monitor processing program 424, rebuild processing program 425, and priority reordering processing program 426) may be implemented, for example, in a way such that the processor 211 reads a program stored in a drive 214, loads the program into the memory 212, and executes the program, may be implemented by hardware such as dedicated circuits, or may be implemented by combination of software and hardware. Besides, a part of the functions of the node 210 may be implemented by another computer that can communicate with the node 210.

Figure 5:
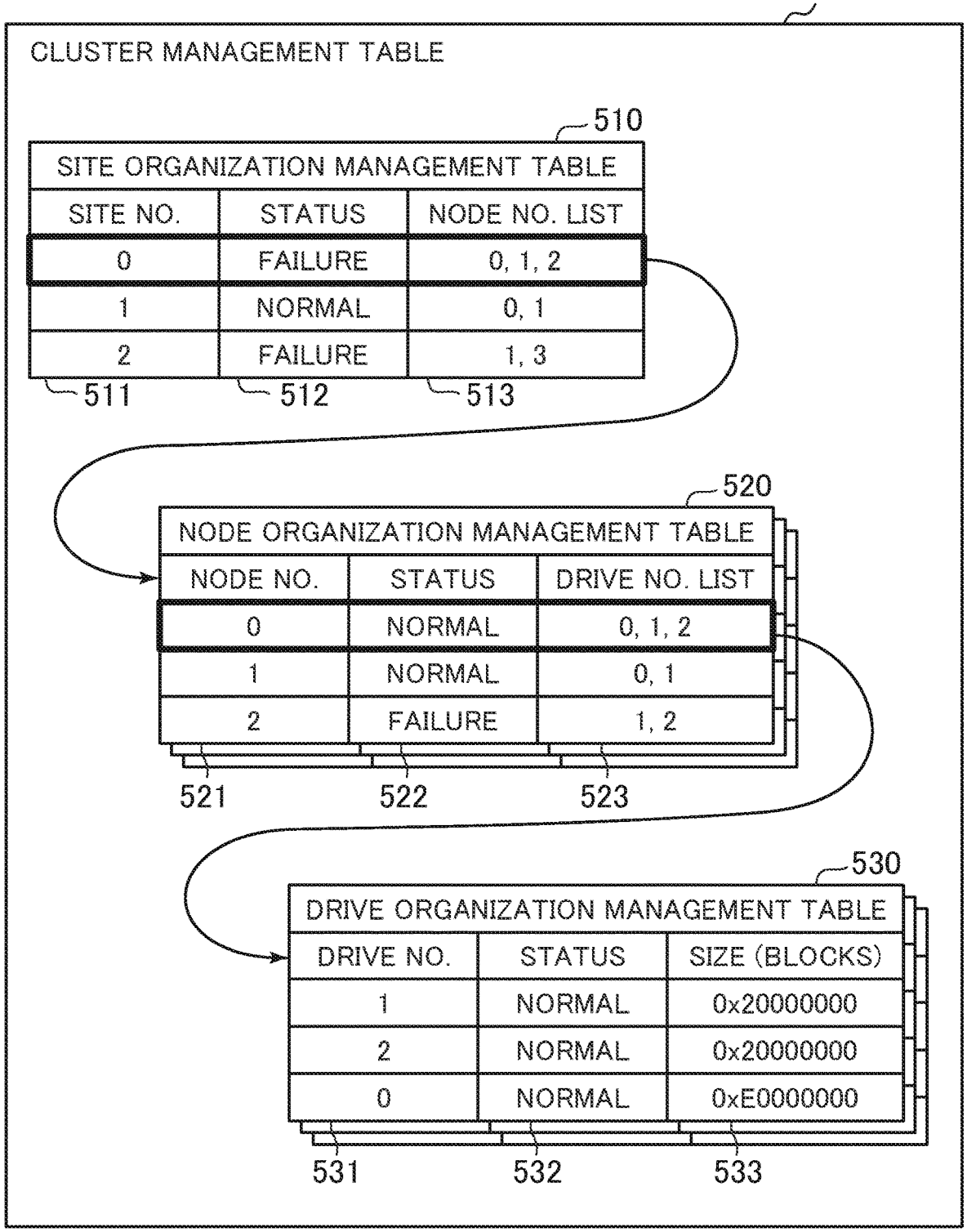
FIG. 5 is a diagram presenting an example of a cluster management table according to the first embodiment.

FIG. 5 is a diagram presenting an example of the cluster management table 411.

The cluster management table 411 stores information for managing the organizations of sites 201, nodes 210, and drives.

The cluster management table 411 is configured including a site organization management table 510, a node organization management table 520, and a drive organization management table 530. Note that the storage system 101 manages the site organization management table 510, a site 201 manages multiple node organization management tables 520 within the site 201, and a node 210 manages multiple drive organization management tables 530 within the node 210.

The site organization management table 510 stores information that represents an organization related to a site 201 (inter alia, a relation between a site 201 and nodes 210). More specifically, the site organization management table 510 stores information in records in which a site number 511, status 512, and a node number list 513 are correlated).

Site number 511 is identifying information enabling it to identify a site 201. Status 512 is status information (NORMAL, WARNING, FAILURE, etc.) indicating the status of the site 201. Node number list 513 is identifying information enabling it to identify nodes 210 that are provided in the site 201.

The node organization management table 520 is provided for each site 201 and stores information that represents an organization related to a node 210 (inter alia, a relation between a node 210 and drives 214). More specifically, the node organization management table 520 stores information in records in which a node number 521, status 522, and a drive number list are correlated.

Node number 521 is identifying information enabling it to identify a node 210. Status 522 is status information (NORMAL, WARNING, FAILURE, etc.) indicating the status of the node 210. Drive number list 523 is identifying information enabling it to identify drives 214 that are provided in the node 210.

The drive organization management table 530 is provided for each node 210 and stores information representing an organization related to drives 214 that are provided in the node 210. More specifically, the drive organization management table 530 stores information in records in which a drive number 531, status 532, and size 533 (blocks) are correlated.

Drive number 531 is identifying information enabling it to identify a drive 214. Status 532 is status information (NORMAL, WARNING, FAILURE, etc.) indicating the status of the drive 214. Size 533 is information indicating the amount of space available in the drive 514 (e.g., the number of blocks). For example, a block has a fixed size (such as 512 bytes).

FIG. 6 is a diagram presenting an example of the storage pool management table 412.

The storage pool management table 412 stores control information for a thin provisioning function that the storage pool 320 provides.

The storage pool management table 412 is configured including a storage pool management table 610, a virtual volume management table 620, and a page mapping table 630.

The storage pool management table 610 stores information related to storage pools 320. More specifically, the storage pool management table 610 stores information in records in which a storage pool number 611, total space 612 (blocks)m and consumed space 613 (blocks) are correlated.

Storage pool number 611 is identifying information enabling it to identify a storage pool 320. Total space 612 is information indicating the total amount of space available in the storage pool 320 (e.g., the number of blocks). Consumed space 613 is information indicating the amount of consumed space in the storage pool 320 (e.g., the number of blocks).

The virtual volume management table 620 stores information related to virtual volumes 330 (inter alia, information indicating a mapping relation between a virtual volume 330 and a storage pool 320 to which the virtual volume 330 was allocated). More specifically, the virtual volume management table 620 stores information in records in which a virtual volume number 621, size 622 (blocks), and a storage pool number 623 are correlated.

Virtual volume number 621 is identifying information enabling it to identify a virtual volume 330. Size 622 (blocks) is information indicating the amount of space variable in the virtual volume 330 (e.g., the number of blocks). Storage pool number 623 is identifying information enabling it to identify a storage pool 320 to which the virtual volume 330 belongs.

The page mapping table 630 stores information related to pages 331 allocated to virtual volumes 330 (inter alia, information indicating a mapping relation between a page 331 and a logical chunk 321). More specifically, the page mapping table 630 stores information in records in which a page number 631, a virtual volume number 632, a Logical Block Address (LBA) 633, size 634 (blocks), a logical chunk number 635, and an LBA 636 are correlated.

Page number 631 is identifying information enabling it to identify a page 331. Virtual volume number 632 is identifying information enabling it to identify a virtual volume 330 to which the page 331 is allocated. LBA 633 is information enabling it to locate the page 331 in the virtual volume 330; e.g., information indicating where it is positioned from the first page 331 in the virtual volume 330. Note that pages 331 are units in which a storage program 360 accesses a virtual volume 330. Size 634 (blocks) is information indicating the amount of space available in the page 331 (the number of blocks). Logical chunk number 635 is identifying information enabling it to identify a logical chunk 321 corresponding to the page 331. LBA 636 is information enabling it to locate the logical chunk 321 in the storage pool 320; e.g., information indicating where it is positioned from the first logical chunk 321 in the storage pool 320.

Note that size 634 may be the same for all pages 331 or differ per page 331.

Additionally, a storage program 360 refers to the page mapping table 630 when converting an address in a virtual volume 330 to an address in the storage pool 320. Also, a storage program 360 performs allocation of a page 331 (adds a record to the page mapping table 630) whenever receiving a new write request.

FIG. 7 is a diagram presenting an example of the parity group management table 413.

The parity group management table 413 stores control information for managing an organization of parity groups 310 (redundancy groups), each being formed by combining a physical chunk 311 with multiple physical chunks.

The parity management table 413 is configured including a logical chunk management table 710, a parity group management table 720, and a physical chunk management table 730.

The logical chunk management table 710 stores information related to logical chunks 321 (logical chunk information) separated out from a parity group 310. More specifically, the logical chunk management table 710 stores information in records in which a logical chunk number 711, size 712 (blocks), and a parity group number 713 are correlated.

Logical chunk number 711 is identifying information enabling it to identify a logical chunk 321 separated out from a parity group 310. Size 712 is information indicating the amount of space available in the logical chunk 321 (e.g., the number of blocks). Parity group number 713 is identifying information enabling it to identify a parity group 310 to which the logical chunk 321 belongs.

The parity group management table 720 stores information related to parity groups 310 (parity group information). More specifically, the parity group management table 720 stores information in records in which a parity group number 721, data protection setup 722, and a physical chunk number 723 are correlated.

Parity group number 721 is identifying information enabling it to identify a parity group 310. Data protection setup 722 is data protection set for the parity group 310. Physical chunk number 723 is identifying information enabling it to identify a physical chunk 311 allocated to the parity group 310.

The physical chunk management table 730 stores information related to physical chunks 311 (information for separating out a physical segment in a drive 214 as much as size from a starting offset and managing it as a physical chunk 311). More specifically, the physical chunk management table 730 stores information in records in which a physical chunk number 731, a starting offset 732, size 733 (blocks), and site number/node number/drive number 734 are correlated.

Physical chunk number 731 is identifying information enabling it to identify a physical chunk 311. Starting offset 732 is information indicating a starting position to separate out the physical chunk 311 from a drive 214. Size 733 (blocks) is information indicating the amount of space available in the physical chunk 311 (the number of blocks). Site number/node number/drive number 734 is identifying information enabling it to identify a storage resource from which the physical chunk 311 is separated out (information indicating that the physical chunk 311 is separated out from what drive 214 on what node 210 in what site 201).

FIG. 8 is a diagram presenting an example of the cache group management table 414.

The cache group management table 414 stores control information for managing cache segments 301 and cached data.

The cache group management table 414 is configured including a cache organization management table 810, a free cache management table 820, and a cache information management table 830.

The cache organization management table 810 stores information (cache segment information) for managing the types of storage devices (a memory 212 or a drive 214 in the present example) in which cache segments 301 are configured and physical segments that are allocated to a cache group 300. Note that a physical segment registered in the cache organization management table 810 becomes a segment belonging to a cache group 300. More specifically, the cache organization management table 810 stores information in records in which a cache segment number 811, type 812, size 813 (blocks), a device number 814, and a staring offset 815 are correlated.

Cache segment number 811 is identifying information enabling it to identify a cache segment 301. Type 812 is identifying information to identify the type of a storage device having a storage region to which the cache segment 301 is allocated. In this field, "memory" is stored if the cache segment 301 is a physical segment in a memory 212 or "drive" is stored if the cache segment 301 is a physical segment in a drive 214. Size 813 is information indicating the amount of space available in the cache segment 301 (e.g., the number of blocks). Device number 814 is identifying information enabling it to identify the storage device having a storage region to which the cache segment 301 is allocated. Note that "Null" is stored, because a node only has one memory 212 in the present example. Starting offset 815 is information indicating a starting position to allocate the cache segment 301.

The free cache management table 820 stores information for managing unused physical segments of each cache segment 301. A cache segment 301 is comprised of physical segments (entries) of given size. More specifically, the free cache management table 820 stores information in records in which a cache segment number 821 and free entry 822 are correlated. Note that, when data is written to a cache segment 301, the free cache management table 820 is referenced and an unused entry is reserved.

Cache segment number 821 is identifying information enabling it to identify a cache segment 301. Free entry 822 is information enabling it to specify an unused entry in the cache segment 301. In the free entry 822 field, entry information (offset and size in the present example) per unused entry is included. Note that size (the amount of space) of an entry may be constant or differ per entry. For instance, in a case where multiple variants of size are provided, free entry 822 fields per size may be provided.

The cache information management table 830 stores information for managing information on cached data. For instance, the cache information management table 830 stores information indicating that data in what region in a virtual volume is cached and information indicating a cache segment where the data is stored. More specifically, the cache information management table 830 stores information in records in which a virtual volume number 831, an LBA 832, a cache segment number 833, and entry information 834 are correlated.

Virtual volume number 831 is identifying information enabling it to identify a virtual volume 330. LBA 832 is information enabling it to locate data in the virtual volume 330 (e.g., an address). Cache segment number 833 is identifying information enabling it to identify a cache segment 301 and information enabling it to specify a cache segment 301 where the data in the virtual volume 330 is stored. Entry information 834 is information enabling it to specify an entry in which the data in the virtual volume 330 is stored in the data segment 301.

In deciding whether or not data in a virtual volume 330 is cached, the cache information management table 830 is referenced and it is verified whether or not a record having the virtual volume number and LAB of the data is registered. In this respect, because, when searching for a record, it requires time to check records in the cache information management table 830 from the first one, the entry information 834 may be managed using a hash table with the keys of virtual volume number 831 and LBA 832. By the hash table, searching through the entry information 834 can be speeded up.

FIG. 9 is a diagram presenting an example of the monitor management table 415.

The monitor management table 415 stores control information for managing frequency of access to pages 331 in virtual volumes 330.

The monitor management table 415 is configured including a long-period monitoring information table 910, a short-period monitoring information table 920, and a frequency distribution table 930.

The long-period monitoring information table 910 stores information on frequency of access to pages 331 at a long period. More specifically, the long-period monitoring information table 910 stores information in records in which a page number 911, a read counter 912, a write counter 913, monitoring start time 914, and a fixed value of access frequency are correlated.

Page number 911 is identifying information enabling it to identify a page 331 in a virtual volume 330. Read counter 912 is information for managing the number of times the page 331 has been read. Write counter 913 is information for managing the number of times data has been written to the page 331. Monitoring start time 914 is information indicating time at which monitoring of access to the page 331 was started. Fixed value of access frequency 915 is information indicating a fixed value of frequency of access to the page 331 (a fixed value of long-period monitoring). A fixed value of long-period monitoring is, for example, calculated by Equation 1 below, $$\text{Fixed value of long-period monitoring} = (\text{read count} + \text{write count})/(\text{fixing time of monitoring} - \text{monitoring start time}) \quad \text{Equation 1}$$

The short-period monitoring information table 920 stores information on frequency of access to pages 331 at a short period. More specifically, the short-period monitoring information table 920 stores information in records in which a page number 921, a read counter 922, a write counter 923, a monitoring start time 924, time of last access 925, and fixed value of access frequency 926 are correlated.

Page number 921 is identifying information enabling it to identify a page 331 in a virtual volume 330. Read counter 922 is information for managing the number of times the page 331 has been read. Write counter 923 is information for managing the number of times data has been written to the page 331. Monitoring start time 924 is information indicating time at which monitoring of access to the page 331 was started. Time of last access 925 is information indicating time at which the page 331 was last accessed.

Fixed value of access frequency 926 is information indicating a fixed value of frequency of access to the page 331 (a fixed value of short-period monitoring). A fixed value of short-period monitoring may, for example, be calculated by either the above Equation 1 or Equation 2 below. If this value is calculated by Equation 2 below, calculation is executed when the number of times the page has been accessed (the sum of a read count and a write count) has reached a predefined value (a monitoring fixing counter value).

$$\text{Fixed value of short-period monitoring} = (\text{monitoring fixing counter value})/(\text{fixing time of monitoring} - \text{monitoring end time}) \quad \text{Equation 2}$$

Note that the long-period monitoring information table 910 may alternatively be configured to manage time of last access and a fixed value of long-period monitoring may also be calculated by Equation 2.

The frequency distribution table 930 stores information regarding pages 331 reordered in descending order of access frequency according to the fixed values of long-period monitoring and short-period monitoring. According to the frequency distribution table 930, priority ordering for rebuilding is determined. More specifically, the frequency distribution table 930 stores information in records in which a pool number 931, priority level 932 (IOPS: Input/Output Per Second), the number of pages 933, and a page number list 934 are correlated.

Pool number 931 is identifying information enabling it to identify a storage pool 320. Load level 932 is information for classifying access frequency; e.g., a parameter that is set in a designing phase. The number of pages 933 is information indicating the number of pages 331 that fall in each load level 932. Page number list 934 is identifying information enabling it to identify pages 331 that fall in each load level 932.

Figure 10:
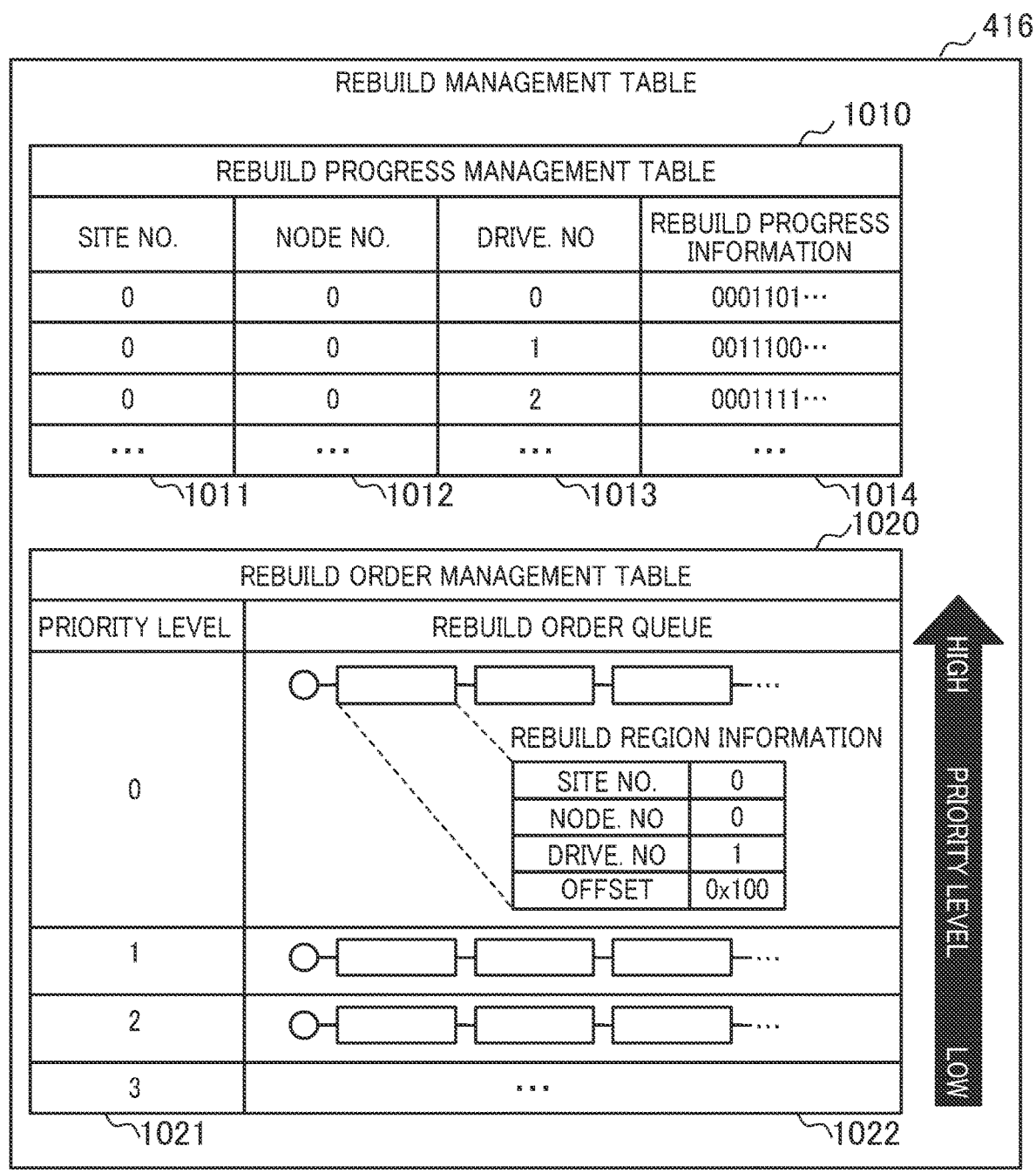
FIG. 10 is a diagram presenting an example of a rebuild management table according to the first embodiment.

FIG. 10 is a diagram presenting an example of the rebuild management table 416.

The rebuild management table 416 stores control information for managing the progress and order of rebuilding.

The rebuild management table 416 is configured including a rebuild progress management table 1010 and a rebuild order management table 1020.

The rebuild progress management table 1010 stores information indicating whether or not rebuilding is complete for physical segments in a drive 214 in which failure occurs (e.g., the drive is damaged) (rebuild progress information). Rebuild progress information is, for example, managed with a bitmap table. More specifically, the rebuild progress management table 1010 stores information in records in which a site number 1011, a node number 1012, a drive number 1013, and rebuild progress information 1014 are correlated.

Site number 1011 is identifying information enabling it to identify a site 201 where rebuilding should be performed. Node number 1012 is identifying information enabling it to identify a node 210 where rebuilding should be performed. Drive number 1013 is identifying information enabling it to identify a drive 214 for which rebuilding should be performed. Rebuild progress information 1014 is information indicating whether or not rebuilding is complete for each rebuild management unit (each target region to rebuild) in the drive 214 for which rebuilding should be performed. In the present embodiment, progress information is managed in a bitmap form. In a bitmap, the first bit corresponds to the first one of target regions to rebuild in the drive 214 for which rebuilding should be performed and one bit represents the progress of rebuilding one target region to rebuild. In the present example, a bit value of "1" indicates that rebuilding is not complete.

The rebuild order management table 1020 stores information on rebuild order queues 1022 per priority level. When rebuilding is performed, the rebuilding can sequentially be executed, beginning with the first region in a rebuild order queue 1022 having the highest priority. More specifically, the rebuild order management table 1020 stores information in records in which priority level 1021 and a rebuild order queue 1022 are correlated.

Priority level 1021 is information indicating priority of rebuilding. Note that priority level 1021 is determined by access frequency with the addition of a target region specified by user. Rebuild order queue 1022 is information for determining rebuild ordering. In the rebuild order queue 1022 field, rebuild region information (a site number 1011 and a node number 1012 where rebuilding should be performed, a drive number 1013 for which rebuilding should be performed, and an offset indicating the location of a target region to rebuild) is managed in a list form.

Note that rebuild region information can be managed with a hash table to speed up search.

Then, processing is described that the storage system 101 carries out.

Figure 11:
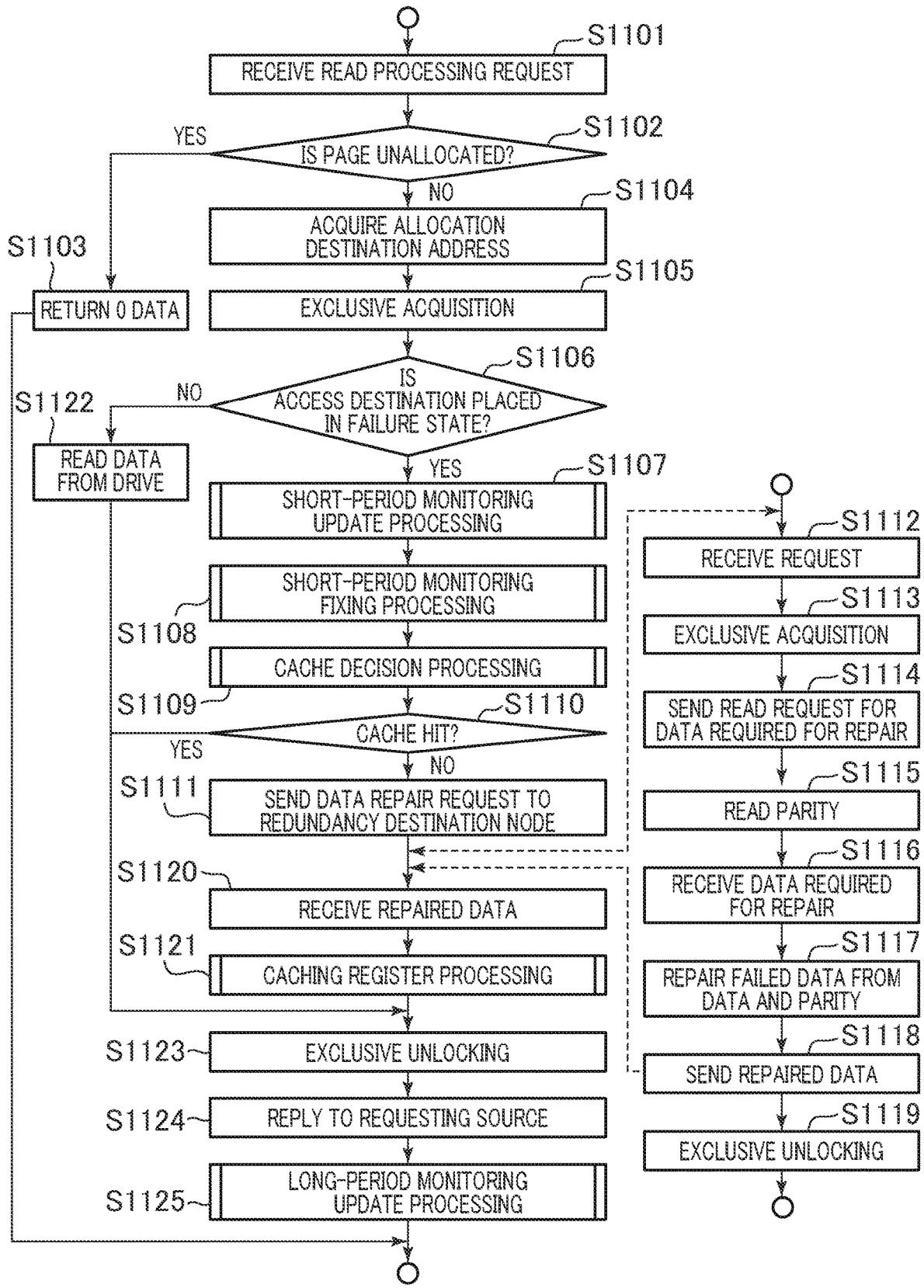
FIG. 11 is a diagram illustrating an example of a flowchart about read processing according to the first embodiment.

FIG. 11 is a diagram illustrating an example of a flowchart about read processing. In read processing, when a node 210 receives a read processing request for data from an application 351, the data is read from a drive on the node 210. Note that, in the read processing request, a read destination (e.g., inter alia, a virtual volume number such as a Logical Unit Number (LUN) and an address such as an LBA) is specified. If an access destination (such as a drive 214) is placed in a failure state, the target data to read is repaired from redundant data and returned. Detail is described below.

At step S1101, the read processing program 421 receives a read processing request from an application 351.

At step S1102, the read processing program 421 decides whether or not a page 331 for data of the read processing request is unallocated in a storage pool 320. If having decided that the page is unallocated, the read processing program 421 moves processing to step S1103; if having decided that the page is not unallocated, it moves processing to step S1104.

At step S1103, the read processing program 421 returns 0 data indicating that the data does not exist to the application 351 and terminates the read processing.

At step S1104, the read processing program 421 acquires the address of an access destination (allocation destination).

At step S1105, the read processing program 421 performs exclusive acquisition. For the access destination LBA, exclusive acquisition exerts control so that multiple processing tasks do not access the same region at the same time, using an exclusive algorithm such as Mutex. The same processing is performed also in the case of exclusive acquisition which will be mentioned hereinafter.

At step S1106, the read processing program 421 decides whether or not the access destination drive 214 is placed in a failure state. If having decided that the access destination drive 214 is placed in a failure state, the read processing program 421 moves processing to step S1107; if having decided that the access destination drive 214 is not placed in a failure state, it moves processing to step S1122.

At step S1107, the read processing program 421 instructs the monitor processing program 424 to perform short-period monitoring update processing. In short-period monitoring update processing, for example, the read counter 922 or write counter 923 is updated. Short-period monitoring update processing will be described later with FIG. 13A.

At step S1108, the read processing program 421 instructs the monitor processing program 424 to perform short-period monitoring fixing processing. In short-period monitoring fixing processing, for example, the fixed value of access frequency 926 is updated. Short-period monitoring fixing processing will be described later with FIG. 13B.

At step S1109, the read processing program 421 instructs the cache processing program 423 to perform cache decision processing. In cache decision processing, for example, it is decided whether or not the data of the read processing request is stored in a cache segment 301. If it is decided that the data of the read processing request is stored in a cache segment 301, cache hit is returned. Cache decision processing will be described later with FIG. 14A.

At step S1110, the read processing program 421 decides whether or not a result of cache decision processing is cache hit. If having decided that a result of cache decision processing is cache hit, the read processing program 421 moves processing to step S1123; if having decided that a result of cache decision processing is not cache hit, it moves processing to step S1111.

At step S1111, the read processing program 421 sends a request to repair the data (a data repair request) to a redundancy destination node 210 having parity for the data of the read processing request.

At step S1112, a read processing program 421 running on the redundancy destination node 210 (the read processing program at the redundancy destination) receives the data repair request.

At step S1113, the read processing program at the redundancy destination performs exclusive acquisition.

At step S1114, the read processing program at the redundancy destination sends a read request for data required for repair. Note that, here, communication between nodes 210 is triggered, which is, however, omitted from depiction, and such data is read from another node 210 having data that forms the same stripe with data that needs repair (failed data).

At step S1115, the read processing program at the redundancy destination reads the parity required for repair.

At step S1116, the read processing program at the redundancy destination receives the data required for repair.

At step S1117, the read processing program at the redundancy destination repairs the failed data from the data and the parity (generates repaired data).

At step S1118, the read processing program at the redundancy destination sends the repaired data to the read processing program 421 that is the source of sending the data repair request.

At step S1119, the read processing program at the redundancy destination performs exclusive unlocking.

At step S1120, the read processing program 421 receives the repaired data.

At step S1121, the read processing program 421 instructs the cache processing program 423 to perform caching processing. In caching processing, for example, caching the repaired data into a cache segment 301 is performed. Caching processing will be described later with FIG. 14B.

At step S1122, the read processing program 421 reads data from a drive 214 (a local drive) on the node 210 where it runs.

At step S1123, the read processing program 421 performs exclusive unlocking.

At step S1124, the read processing program 421 returns the data of the read processing request as a reply to the requesting source (sending the data to, inter alia, the application 351 or write processing program 422).

At step S1125, the read processing program 421 instructs the cache processing program 423 to perform long-period monitoring update processing for the target page to read 331 and terminates the read processing. In long-period monitoring update processing, for example, the read counter 912 or write counter 913 of the target page to read 331 is updated. Long-period monitoring update processing will be described later with FIG. 13C.

Figure 12:
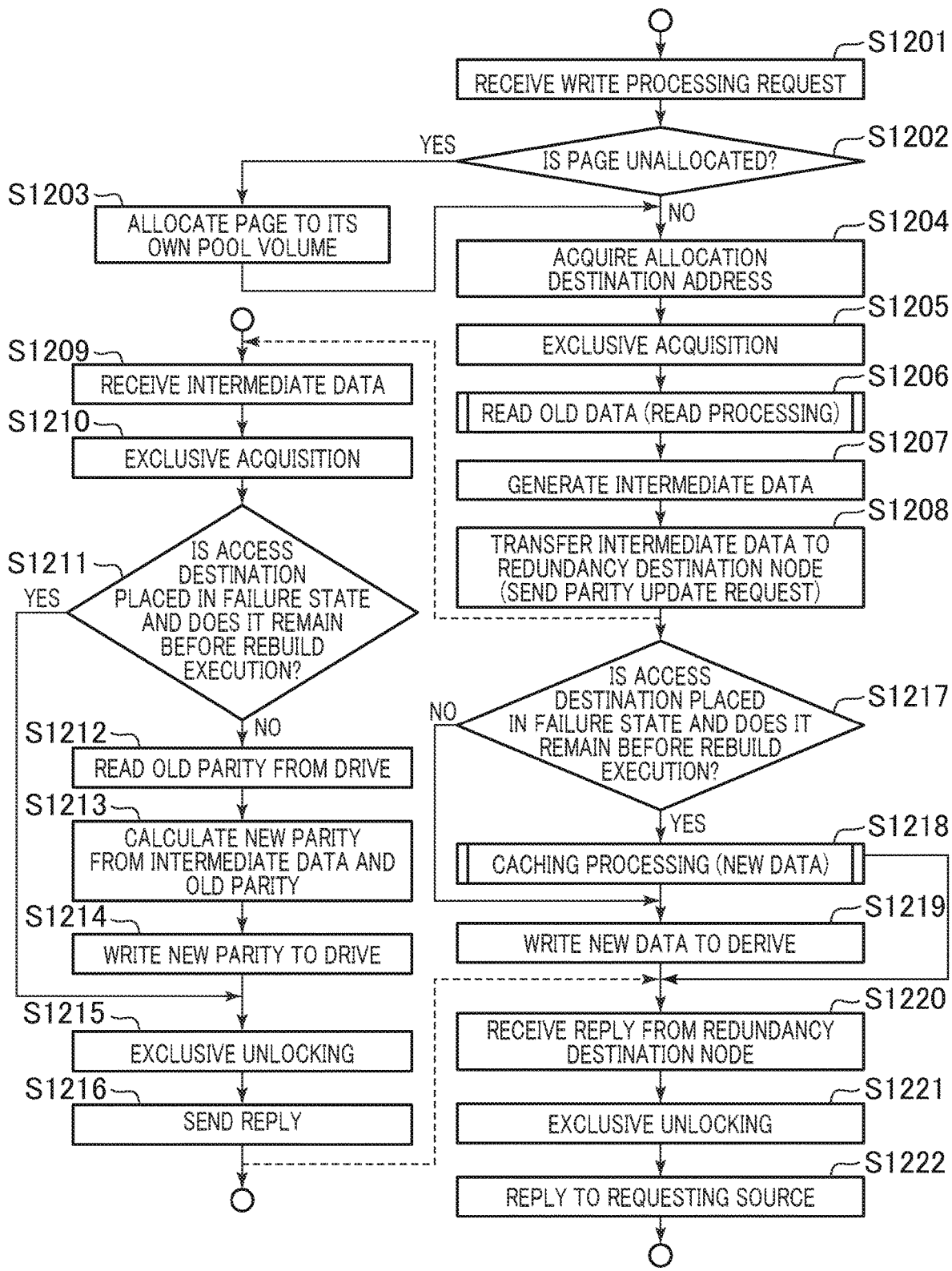
FIG. 12 is a diagram illustrating an example of a flowchart about write processing according to the first embodiment.

FIG. 12 is a diagram illustrating an example of a flowchart about write processing. In write processing, a node 210 receives a write processing request from an application 351, data is written to a drive 214 on the node 210; furthermore, redundant data (parity) is written to a drive 214 on another node 210. Note that, in the write processing request, a write destination (e.g., inter alia, a virtual volume number such as an LUN and an address such as an LBA) is specified. Detail is described below.

At step S1201, the write processing program 422 receives a write processing request from an application 351.

At step S1202, the write processing program 422 decides whether or not a page 331 for data of the write processing request is unallocated in a storage pool 320. If having decided that the page is unallocated, the write processing program 422 moves processing to step S1203; if having decided that the page is not unallocated, it moves processing to step S1204.

At step S1203, the write processing program 422 allocates a page 331 to a logical chunk 321 with which a physical chunk 311 in a drive 214 on the node 210 where it runs is associated (its own pool volume of the node).

At step S1204, the write processing program 422 acquires the address of an access destination (allocation destination).

At step S1205, the write processing program 422 performs exclusive acquisition.

At step S1206, the write processing program 422 reads data before write (old data) (more specifically, read processing as in FIG. 11 is performed for the old data).

At step S1207, the write processing program 422 generates intermediate data. Intermediate data is temporary data that is created when data is partially updated and data indicating a difference between new and old data. For example, if an old data stripe is "A1-A2-AP", intermediate data is obtained as below:

AP (old parity)=A1 (old data) XOR A2 (old data)
A1 (new data) XOR A1 (old data)=M (intermediate data)
Additionally, new parity is obtained as below:
AP (old parity) XOR M (intermediate data)=AP (new parity)

At step S1208, the write processing program 422 sends the intermediate data (a parity update request) to a redundancy destination node 210. Note that the write processing program 422 transfers the intermediate data according to a redundancy degree (to two or more nodes 210 when the redundancy degree is 2 or more).

At step S1209, a write processing program 422 running on the redundancy destination node (the write processing program at the redundancy destination) receives the intermediate data.

At step S1210, the write processing program at the redundancy destination performs exclusive acquisition.

At step S1211, the write processing program at the redundancy destination decides whether or not an access destination drive 214 is placed in a failure state and remains before rebuild execution. If having decided that the access destination drive 214 is placed in a failure state and remains before rebuild execution, the write processing program at the redundancy destination moves processing to step S1215; if having decided that the access destination drive 214 is not placed in a failure state or does not remain before rebuild execution, it moves processing to step S1212.

At step S1212, the write processing program at the redundancy destination reads old parity from a drive 214 on the node 210 where it runs.

At step S1213, the write processing program at the redundancy destination calculates new parity from the intermediate data and the old parity.

At step S1214, the write processing program at the redundancy destination writes the new parity to a drive 214 on the node 210 where it runs.

At step S1215, the write processing program at the redundancy destination performs exclusive unlocking.

At step S1216, the write processing program at the redundancy destination sends a write reply to the write processing program 422 that is the source of the parity update request.

At step S1217, the write processing program 422 decides whether or not an access destination drive 214 is placed in a failure state and remains before rebuild execution. If having decided that the access destination drive 214 is placed in a failure state and remains before rebuild execution, the write processing program 422 moves processing to step S1218; if having decided that the access destination drive 214 is not placed in a failure state or does not remain before rebuild execution, it moves processing to step S1219.

At step S1218, the write processing program 422 instructs the cache processing program 423 to perform caching processing. In caching processing, for example, caching the data (new data) of the write processing request into a cache segment 301 is performed. Caching processing will be described later with FIG. 14B.

At step S1219, the write processing program 421 writes the new data to a drive 214 on the node 210 where it runs.

At step S1220, the write processing program 422 receives the write reply from the redundancy destination node 210.

At step S1221, the write processing program 422 performs exclusive unlocking.

At step S1222, the write processing program 422 sends a reply to the requesting source (e.g., sending information indicating that the write is complete to the application 351).

Figure 13A:
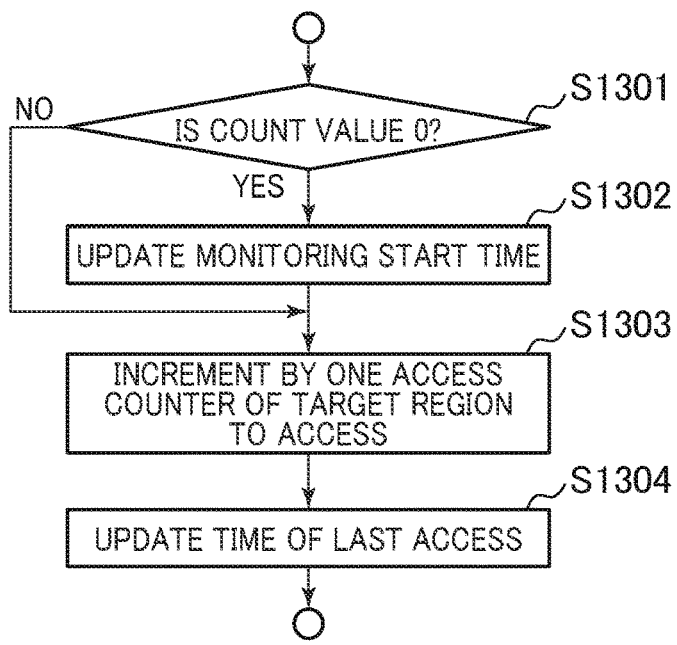
FIG. 13A is a diagram illustrating an example of a flowchart about short-period monitoring update processing according to the first embodiment.

FIG. 13A is a diagram illustrating an example of a flowchart about short-period monitoring update processing.

At step S1301, the monitor processing program 424 decides whether or not a count value regarding a target page 331 to access (a target region to access) is "0". The target region to access is a target page 331 to read if short-period monitoring update processing is performed, triggered with a read processing request or a target page 331 to write if short-period monitoring update processing is performed, triggered with a write processing request. The count value regarding the target region to access is, for example, a sum value of the read counter 922 and the write counter 923 of the target region to access. Note that, when long-period mode 1811 or short-period mode 1812, as will be described later, was set OFF, processing as to monitoring update and fixing is skipped without being executed. This is also true for FIG. 13B. If having decided that the count value is "0", the monitor processing program 424 moves processing to step S1302; if having decided that the count value is not "0", it moves processing to step S1303.

At step S1302, the monitor processing program 424 updates the monitoring start time 924 (e.g., sets it to the current time).

At step S1303, the monitor processing program 424 increments by one the access counter of the target region to access. More specifically, the monitor processing program 424 increments by one the read counter 922 of the target page 331 to read if short-period monitoring update processing is performed, triggered with a read processing request or increments by one the write counter 923 of the target page 331 to write if short-period monitoring update processing is performed, triggered with a write processing request.

At step S1304, the monitor processing program 424 updates the time of last access 925 for the target region to access (e.g., sets it to the current time) and terminates the short-period monitoring update processing.

Figure 13B:
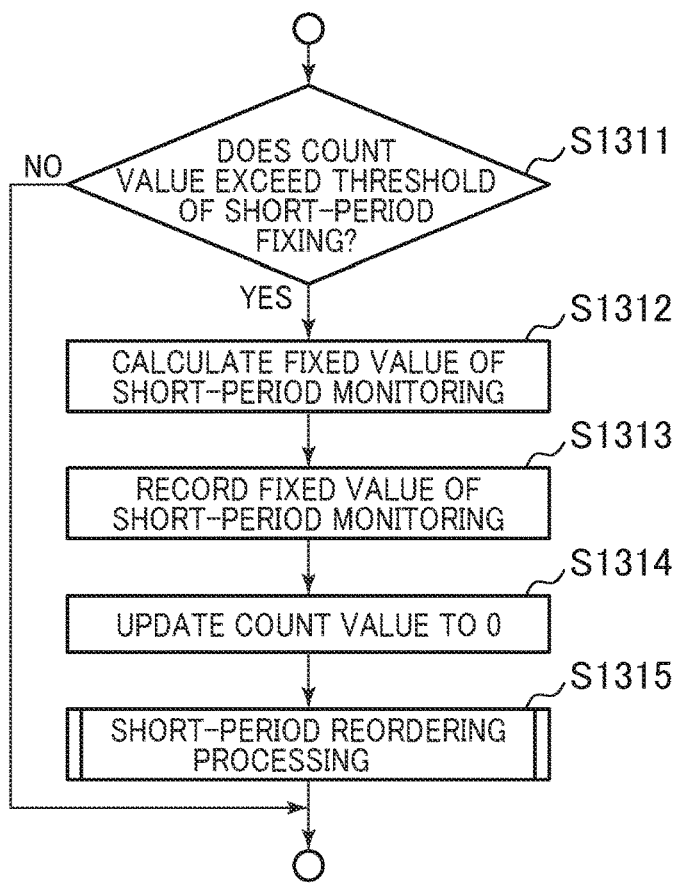
FIG. 13B is a diagram illustrating an example of a flowchart about short-period monitoring fixing processing according to the first embodiment.

FIG. 13B is a diagram illustrating an example of a flowchart about short-period monitoring fixing processing.

At step S1311, the monitor processing program 424 decides whether or not the count value exceeds the monitoring fixing counter value (a threshold of short-period fixing). If having decided that the counter value exceeds the threshold of short-period fixing, the monitor processing program 424 moves processing to step S1312; if having decided that the counter value does not exceed the threshold of short-period fixing, it terminates the short-period monitoring fixing processing.

At step S1312, the monitor processing program 424 calculates a fixed value of short-period monitoring, using Equation 2 described previously.

At step S1313, the monitor processing program 424 records the calculated fixed value of short-period monitoring (sets it in the field of fixed value of access frequency 926).

At step S1314, the monitor processing program 424 updates the count value of the target region to access to "0". For example, the monitor processing program 424 updates the values of both the read counter 922 and the write counter 923 to "0".

At step S1315, the monitor processing program 424 performs short-period reordering processing. Short-period reordering processing will be described later with FIG. 16C.

FIG. 13C is a diagram illustrating an example of a flowchart about long-period monitoring update processing.

At step S1321, the monitor processing program 424 increments by one the access counter of the target page 331 to access (the target region to access), thus executing long-period monitoring update processing. The target region to access is a target page 331 to read if long-period monitoring update processing is performed, triggered with a read processing request or a target page 331 to write if long-period monitoring update processing is performed, triggered with a write processing request. This is also true for FIG. 13D. In other words, the monitor processing program 424 increments by one the read counter 912 of the target page 331 to read if long-period monitoring update processing is performed, triggered with a read processing request or increments by one the write counter 913 of the target page 331 to write if long-period monitoring update processing is performed, triggered with a write processing request.

FIG. 13D is a diagram illustrating an example of a flowchart about long-period monitoring fixing processing.

At step S1331, the monitor processing program 424 decides whether or not a monitoring period (a value obtained by subtracting the monitoring start time 914 from the current time) exceeds a threshold of long-period fixing (a preset value, e.g., one day, one week, etc.). If having decided that the monitoring period exceeds the threshold of long-period fixing, the monitor processing program 424 moves processing to step S1332; if having decided that the monitoring period does not exceed the threshold of long-period fixing, it terminates the long-period monitoring fixing processing.

At step S1332, the monitor processing program 424 acquires the current time as monitoring end time.

At step S1333, the monitor processing program 424 calculates a fixed value of long-period monitoring, using Equation 1 described previously.

At step S1334, the monitor processing program 424 records the calculated fixed value of long-period monitoring (sets it in the field of fixed value of access frequency 915).

At step S1335, the monitor processing program 424 updates the value (count value) of the access counter of the target region to access to "0". For example, the monitor processing program 424 updates the values of both the read counter 912 and the write counter 913 to "0".

At step S1336, the monitor processing program 424 refers to the rebuild order management table 1020 and decides whether or not rebuild execution is in process. If having decided that rebuild execution is in process, the monitor processing program 424 moves processing step S1337; if having decided that rebuild execution is not in process, it moves processing to step S1338.

At step S1337, the monitor processing program 424 performs long-period reordering processing. In long-period reordering processing, for example, rebuild ordering can be updated. Long-period reordering processing will be described later with FIG. 16D.

At step S1338, the monitor processing program 424 updates the monitoring start time 914 (sets it to the current time) and terminates the long-period monitoring fixing processing.

Figure 14A:
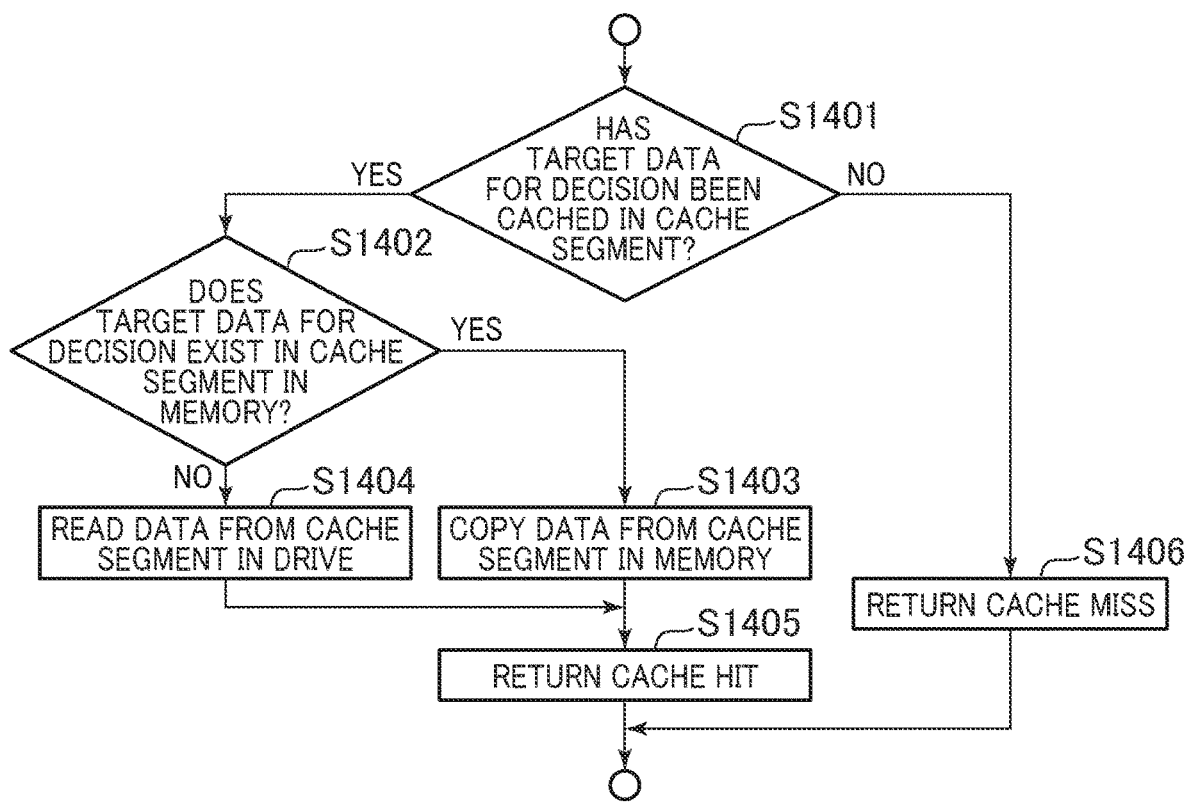
FIG. 14A is a diagram illustrating an example of a flowchart about cache decision processing according to the first embodiment.

FIG. 14A is a diagram illustrating an example of a flowchart about cache decision processing.

At step S1401, the cache processing program 423 refers to the cache information management table 830 and decides whether or not target data for decision (e.g., data of a read processing request or data in a target region to rebuild which will be described later) has been cached in a cache segment 301. If having decided that the target data for decision has been cached in a cache segment 301, the cache processing program 423 moves processing to step S1402; if having decided that the target data for decision has not been cached in a cache segment 301, it moves processing to step S1406.

At step S1402, the cache processing program 423 refers to the cache organization management table 810 and the cache information management table 830 and decides whether or not the target data for decision exists in a cache segment 301 in the memory 212 (a memory cache segment). If having decided that the target data for decision exists in a memory cache segment, the cache processing program 423 moves processing to step S1403; if having decided that the target data for decision does not exist in a memory cache segment, it moves processing to step S1404.

At step S1403, the cache processing program 423 copies the data from the memory cache segment.

At step S1404, the cache processing program 423 reads data from a cache segment 301 in a drive 214 (a drive cache segment).

At step S1405, the cache processing program 423 returns cache hit to the caller (the read processing program 421 or the rebuild processing program 425) and terminates the cache decision processing.

At step S1406, the cache processing program 423 returns cache miss to the caller (the read processing program 421 or the rebuild processing program 425) and terminates the cache decision processing.

Figure 14B:
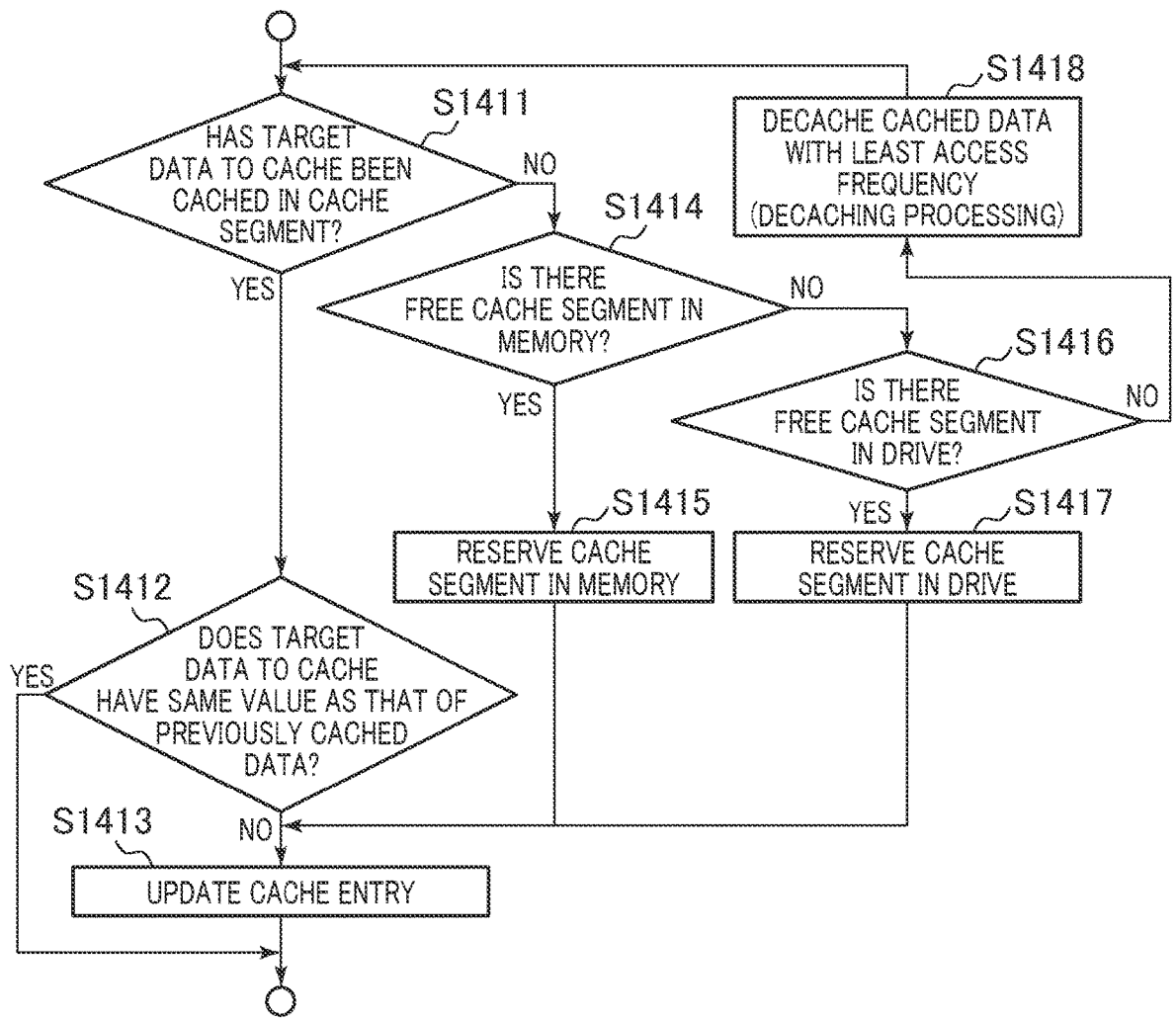
FIG. 14B is a diagram illustrating an example of a flowchart about caching processing according to the first embodiment.

FIG. 14B is a diagram illustrating an example of a flowchart about caching processing. In caching processing, data of a read processing request or data of a write processing request is cached into a cache segment 301, if the data is uncached in any cache segment 301. In the following, data of a read processing request or data of a write processing request to be cached into a cache segment 301 is referred to as "target data to cache". When previous data corresponding to target data to cache has been cached in a cache segment 301, the data is referred to as "previously cached data". Detail is described below.

At step S1411, the cache processing program 423 decides whether or not target data to cache has been cached in a cache segment 301 by searching the cache information management table 830 for the virtual volume number and LBA relevant to the target data to cache. If having decided that the target data to cache has been cached in a cache segment 301, the cache processing program 423 moves processing to step S1412; if having decided that the target data to cache has not been cached in a cache segment 301, it moves processing to step S1414.

At step S1412, the cache processing program 423 decides whether or not target data to cache has the same value as that of previously cached data. If having decided that target data to cache has the same value as that of previously cached data, the cache processing program 423 terminates the caching processing; if having decided that target data to cache does not have the same value as that of previously cached data, it moves processing to step S1413. For instance, when target data to cache that has been read previously will now be read, it has the same value as that of previously cached data; whereas, when a write will now be performed, the target data to cache does not have the same value as that of previously cached data.

At step S1413, the cache processing program 423 updates the previously cached data in the cache segment 301 to the target data to cache (updates the cache entry) and terminates the caching processing.

At step S1414, the cache processing program 423 refers to the cache organization management table 810 and the free cache management table 820 and decides whether or not there is a free space available for caching the target data to cache as a cache segment 301 in the memory 212 (whether or not there is a free memory cache segment). If having decided that there is a free memory cache segment, the cache processing program 423 moves processing to step S1415; if having decided that there is not a free memory cache segment, it moves processing to step S1416.

At step S1415, the cache processing program 423 reserves a cache segment 301 in the memory 212. More specifically, the cache processing program 423 registers entry information of a free entry 822 in the memory 212 as much as the space required to cache the target data to cache into the cache information management table 830 and deletes the entry information from the free cache management table 820.

At step S1416, the cache processing program 423 refers to the cache organization management table 810 and the free cache management table 820 and decides whether or not there is a free space available for caching the target data to cache as a cache segment 301 in a drive 214 (whether or not there is a free drive cache segment). If having decided that there is a free drive cache segment, the cache processing program 423 moves processing to step S1417; if having decided that there is not a free drive cache segment, it moves processing to step S1418.

At step S1417, the cache processing program 423 reserves a cache segment 301 in a drive 214. More specifically, the cache processing program 423 registers entry information of a free entry 822 in a drive 214 as much as the space required to cache the target data to cache into the cache information management table 830 and deletes the entry information from the free cache management table 820.

At step S1418, the cache processing program 423 refers to the page mapping table 630 and the frequency distribution table 930, finds out the virtual volume number 632, LBA 633, and size of a page 331 with the least access frequency among pages 331 remaining intact (target data to decache), performs decaching processing on the page, and moves processing to step S1411. Decaching processing will be described below with FIG. 14C.

Figure 14C:
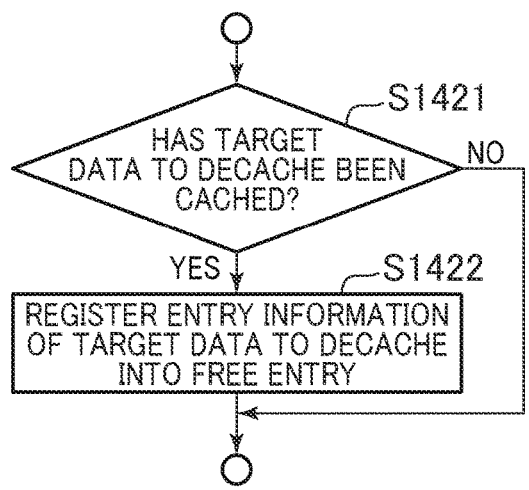
FIG. 14C is a diagram illustrating an example of a flowchart about decaching processing according to the first embodiment.

FIG. 14C is a diagram illustrating an example of a flowchart about decaching processing.

At step S1421, the cache processing program 423 refers to the cache information management table 830 and decides whether or not target data to decache has been cached in a cache segment 301. If having decided that target data to decache has been cached in a cache segment 301, the cache processing program 423 moves processing to step S1422; if having decided that target data to decache has not been cached in a cache segment 301, it terminates the decaching processing.

At step S1422, the cache processing program 423 registers entry information of the target data to decache cached in a cache segment 301 into the field of free entry 822 and deletes the record of the entry information from the cache information management table 830.

Figure 15:
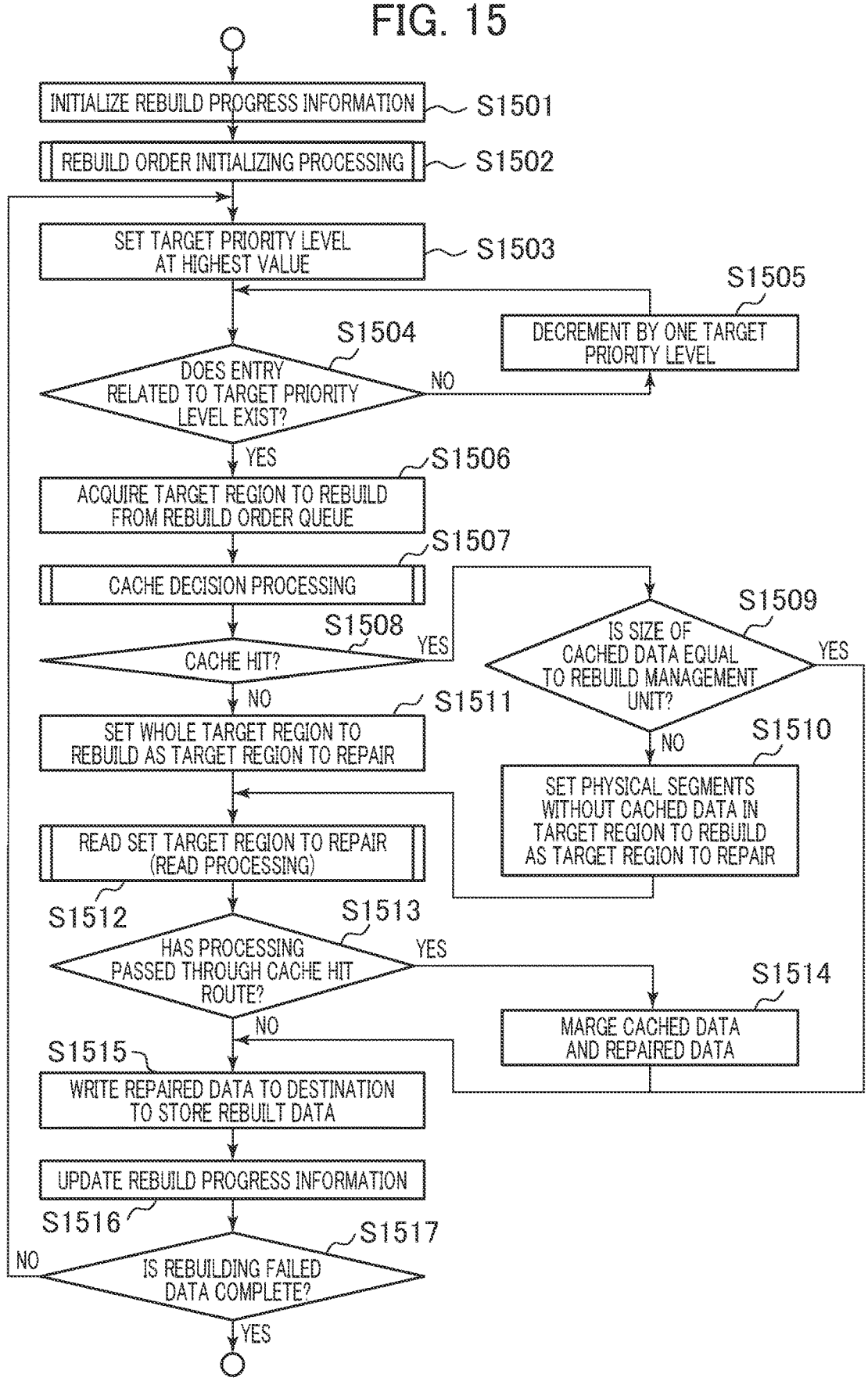
FIG. 15 is a diagram illustrating an example of a flowchart about rebuild processing according to the first embodiment.

FIG. 15 is a diagram illustrating an example of a flowchart about rebuild processing. Rebuild processing is executed when failure in a node 210 or a drive 214 has been detected. Note that a destination to store rebuilt data is determined so that, inter alia, used spaces and I/O loads after rebuilding are leveled among nodes or drives 214. In rebuild processing, rebuilding is executed, beginning with a rebuild order queue 1022 having the highest priority level and processing is repeated until rebuilding all failed portions is complete. Detail is described below.

At step S1501, the rebuild processing program 425 initializes rebuild progress information 1014. The rebuild processing program 425 updates the rebuild progress information 1014 to a progress of 0%. For example, the rebuild processing program 425 updates all bits in a bitmap table in the field of rebuild progress information 1014 to "1" (an unrebuilt state).

At step S1502, the rebuild processing program 425 executes rebuild order initializing processing. In rebuild order initializing processing, rebuild ordering is initialized. Rebuild order initializing processing will be described later with FIG. 16A.

At step S1503, the rebuild processing program 425 sets the priority level 1021 that is a target for processing (target priority level) at the highest value ("0" in the present embodiment).

At step S1504, the rebuild processing program 425 refers to the rebuild order management table 1020 and decides whether or not an entry related to the target priority level exists. If having decided that an entry related to the target priority level exists, the rebuild processing program 425 moves processing to step S1506; if having decided that an entry related to the target priority level does not exist, it moves processing to step S1505.

At step S1505, the rebuild processing program 425 decrements by one the target priority level and moves processing to step S1504.

At step S1506, the rebuild processing program 425 acquires a physical segment (a target region to rebuild) that is to be rebuilt next from a rebuild order queue 1022 associated with the target priority level.

At step S1507, the rebuild processing program 425 instructs the cache processing program 423 to perform cache decision processing. In cache decision processing, it is decided whether or not data in the target region to rebuild is stored in a cache segment 301.

At step S1508, the rebuild processing program 425 decides whether or not a result of the cache decision processing is cache hit. If having decided that a result of the cache decision processing is cache hit, the rebuild processing program 425 moves processing to step S1509; if having decided that a result of the cache decision processing is not cache hit, it move processing to step S1511.

At step S1509, the rebuild processing program 425 decides whether or not the size of the cached data is equal to a rebuild management unit. If having decided that the cached data size is equal to a rebuild management unit, the rebuild processing program 425 moves processing to step S1515; if having decided that the cached data size is not equal to a rebuild management unit, it moves processing to step S1510.

At step S1510, the rebuild processing program 425 sets physical segments without cached data in the target region to rebuild as a target region to repair and moves processing to step S1512.

At step S1511, the rebuild processing program 425 sets the whole target region to rebuild as the target region to repair.

At step S1512, the rebuild processing program 425 instructs the read processing program 421 to perform read processing for the target region to repair. In read processing, data in the target region to repair (repaired data) is read.

At step S1513, the rebuild processing program 425 decides whether or not the processing step S1510 was executed (whether or not processing has passed through a cache hit route). If having decided that processing has passed through the cache hit route, the rebuild processing program 425 moves processing to step S1514; if having decided that processing has not passed through the cache hit route, it moves processing to step S1515.

At step S1514, the rebuild processing program 425 merges the cached data and the repaired data into repaired data in the target region to rebuild.

At step S1515, the rebuild processing program 425 writes the repaired data to a destination to store rebuilt data.

At step S1516, the rebuild processing program 425 updates the rebuild progress information 1014.

At step S1517, the rebuild processing program 425 refers to the rebuild progress information 1014 and decides whether or not rebuilding data (failed data) in all drives 214 in which failure has occurred is complete. If having decided that rebuilding failed data is complete, the rebuild processing program 425 terminates the rebuild processing; if having decided that rebuilding failed data is not complete, it moves processing to step S1503.

Note that multiple rebuild processing tasks may be run in parallel to speed up rebuild processing.

Figure 16A:
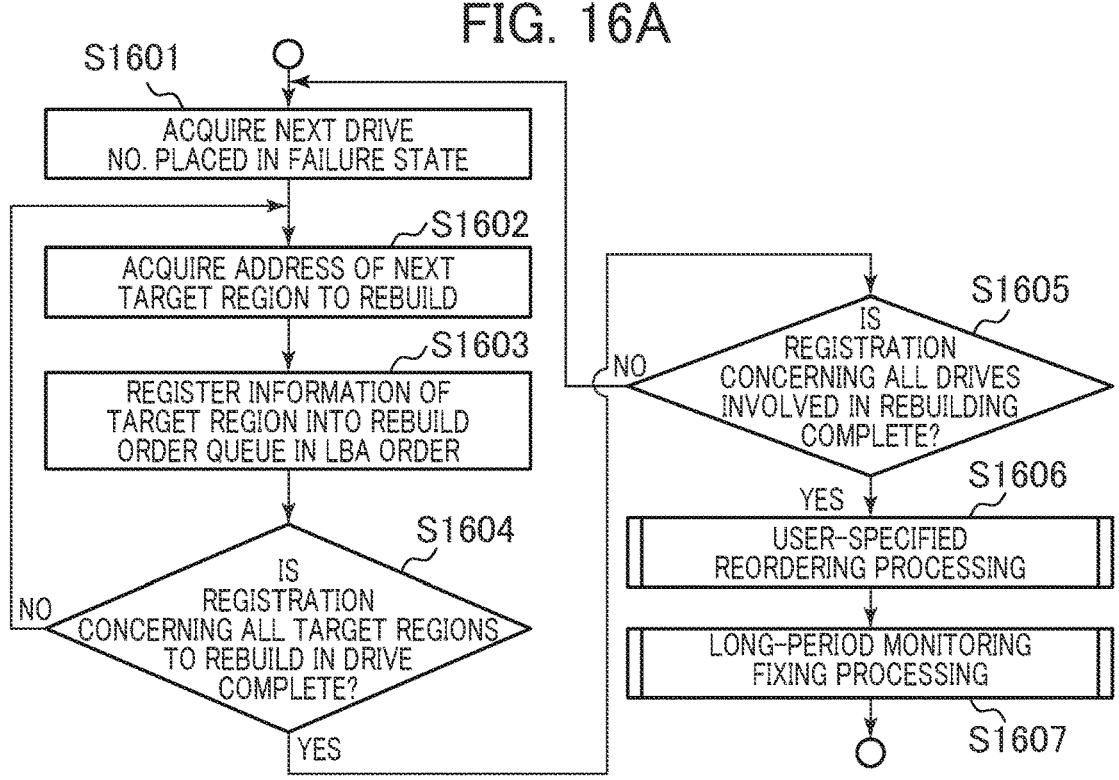
FIG. 16A is a diagram illustrating an example of a flowchart about rebuild order initializing processing according to the first embodiment.
Figure 16B:
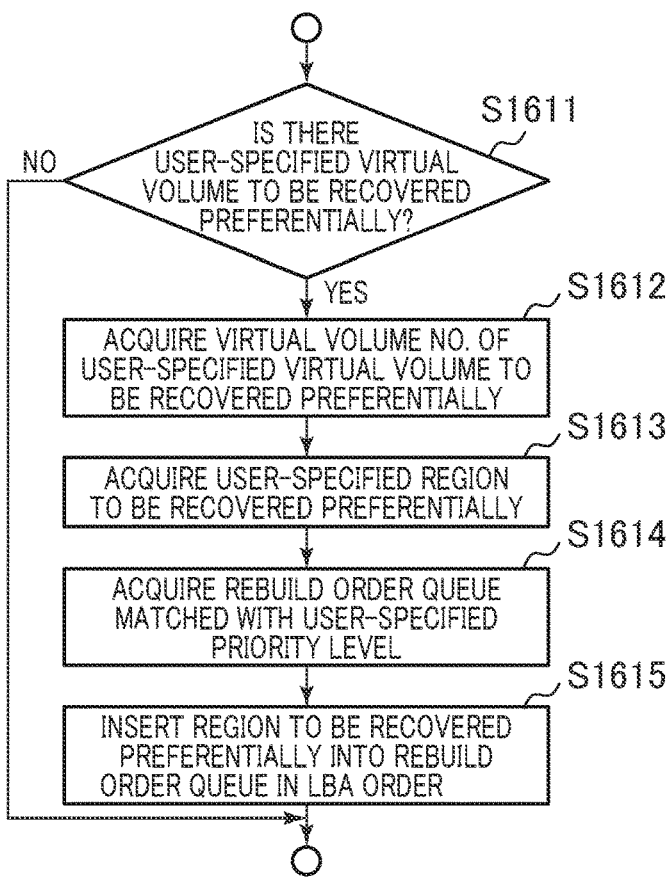
FIG. 16B is a diagram illustrating an example of a flowchart about user-specified reordering processing according to the first embodiment.

FIG. 16A is a diagram illustrating an example of a flowchart about rebuild order initializing processing. In rebuild order initializing processing, rebuild region information is inserted into a rebuild order queue 1022 in LBA order. Then, reordering is executed according to user-specified reordering processing and long-period monitoring fixing processing. Detail is described below.

At step S1601, the priority reordering processing program 426 acquires the drive number of a drive 214 placed in a failure state for which steps S1602 and S1603 which will be described below are not executed (the next drive number in failure state). In the following, the drive 214 having the drive number acquired at step S1601 is referred to as a "target drive for processing".

At step S1602, the priority reordering processing program 426 acquires the address of a target region to rebuild in the target drive for processing, the region having not been registered in a rebuild order queue 1022 (the address of the next target region to rebuild). In the following, the target region to rebuild having the thus acquired address is referred to as a "target region for processing".

At step S1603, the priority reordering processing program 426 registers information of the target region for processing (rebuild region information) into a rebuild order queue 1022 in LBA order.

At step S1604, the priority reordering processing program 426 decides whether or not registration concerning all target regions to rebuild in the target drive for processing into the rebuild order queue 1022 is complete. If having decided that the registration is complete, the priority reordering processing program 426 moves processing to step S1605; if having decided that the registration is not complete, it moves processing to step S1602.

At step S1605, the priority reordering processing program 426 decides whether or not registration concerning all drives 214 involved in rebuilding into the rebuild order queue 1022 is complete. If having decided that the registration is complete, the priority reordering processing program 426 moves processing to step S1606; if having decided that the registration is not complete, it moves processing to step S1601.

At step S1606, the priority reordering processing program 426 performs user-specified reordering processing.

At step S1607, the priority reordering processing program 426 performs long-period monitoring fixing processing and terminates the rebuild order initializing processing.

FIG. 16 is a diagram illustrating an example of a flowchart about user-specified reordering processing. User-specified reordering processing is executed at the start of rebuilding (e.g., during rebuild order initializing processing) when rebuilding is not yet executed or promptly executed upon user request (e.g., by setup via a virtual volume setup screen 820 which will be described later) during execution of rebuilding.

In the storage system 101, as described previously, priority in recovering data is determined depending on characteristics of access to blocks (e.g. pages 331) that store data so as to preferentially recover data that is accessed more frequently. In some cases, nevertheless, data that is accessed less frequently may be important for a user. In that case, if priority of recovery is only determined from the characteristics of access to blocks, recovery of data that is accessed less frequently, but is important for a user is postponed and there is a possibility that such data is lost in case failure reoccurs before or during recovery of the data.

Therefore, data that is important for a user needs to be recovered preferentially regardless of access frequency. To solve this problem, as for important data whose priority cannot be determined only be the characteristics of access to blocks, a user interface is provided to allow the user to specify a region where the data is stored, thereby allowing for preferential recovery of such data. Moreover, it is preferable to provide multiple levels of priority of recovery that a user can specify, so that priority ordering between or among data pieces that are important for the user can be specified.

At step S1611, the priority reordering processing program 426 decides whether or not there is a user-specified virtual volume 330 to be recovered preferentially (a virtual volume to be recovered preferentially). If having decided that there is the virtual volume to be recovered preferentially, the priority reordering processing program 426 moves processing to step S1612; if having decided that there is not the virtual volume to be recovered preferentially, it terminates the user-specified reordering processing.

At step S1612, the priority reordering processing program 426 acquires the virtual volume number of the user-specified virtual volume to be recovered preferentially.

At step S1613, the priority reordering processing program 426 acquires a user-specified region to be recovered preferentially, set via the virtual volume setup screen 1820 which will be described later.

At step S1614, the priority reordering processing program 426 acquires a rebuild order queue 1022 matched with a user-specified priority level set via the virtual volume setup screen 1820 which will be described later.

At step S1615, the priority reordering processing program 426 inserts the acquired region to be recovered preferentially into the acquired rebuild order queue 1022 in LBA order.

Figure 16C:
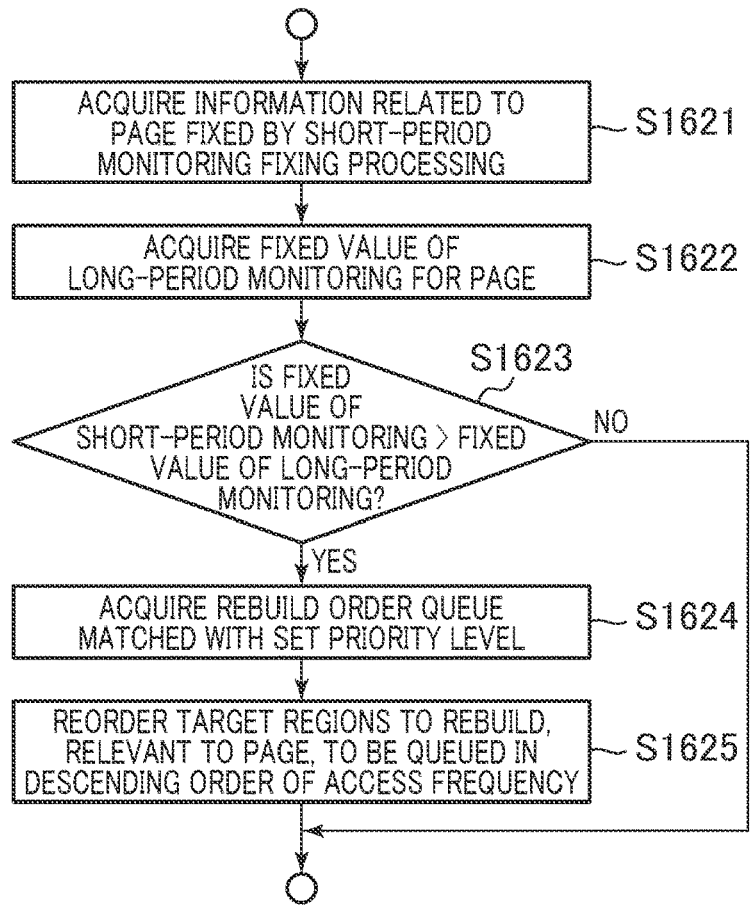
FIG. 16C is a diagram illustrating an example of a flowchart about short-period reordering processing according to the first embodiment.

FIG. 16C is a diagram illustrating an example of a flowchart about short-period reordering processing.

At step S1621, the priority reordering processing program 426 acquires information related to pages 331 fixed by short-period monitoring fixing processing (inter alia, fixed values of short-period monitoring and target regions to rebuild relevant to the pages 331).

At step S1622, the priority reordering processing program 426 acquires fixed values of access frequency 915 (fixed values of long-period monitoring) for the pages 331.

At step S1623, the priority reordering processing program 426 decides whether or not the fixed values of short-period monitoring are larger than the fixed values of long-period monitoring. If having decided that the fixed values of short-period monitoring are larger than the fixed values of long-period monitoring, the priority reordering processing program 426 moves processing to step S1624; if having decided that the fixed values of short-period monitoring are not larger than the fixed values of long-period monitoring, it terminates the short-period reordering processing.

At step S1624, the priority reordering processing program 426 acquires a rebuild order queue 1022 matched with the set priority level 1021 (target priority level).

At step S1625, the priority reordering processing program 426 inserts target regions to rebuild into the rebuild order queue 1022 so that the target regions to rebuild, relevant to the pages 331, will be queued in descending order of the fixed values of short-period monitoring and terminates the short-period reordering processing.

Figure 16D:
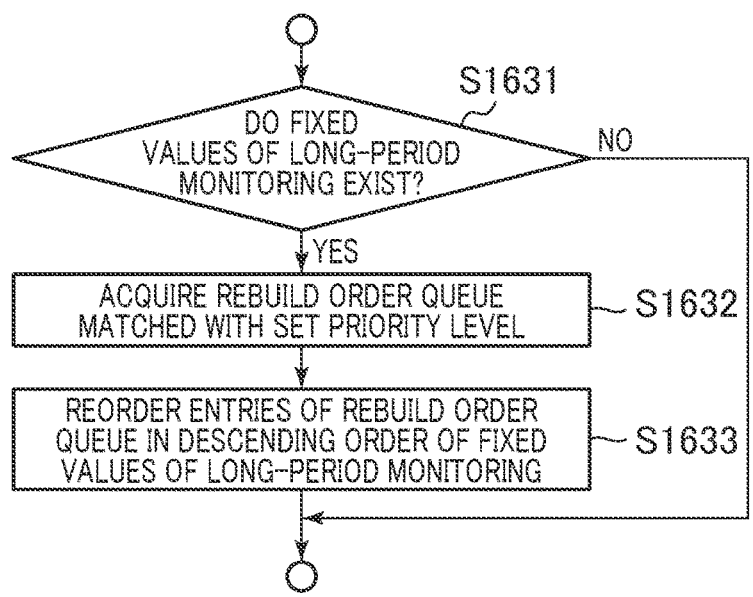
FIG. 16D is a diagram illustrating an example of a flowchart about long-period reordering processing according to the first embodiment.

FIG. 16D is a diagram illustrating an example of a flowchart about long-period reordering processing.

At step S1631, the priority reordering processing program 426 decides whether or not fixed values of long-period monitoring exist. If having decided that fixed values of long-period monitoring exist, the priority reordering processing program 426 moves processing to step S1632; if having decided that fixed values of long-period monitoring do not exist, it terminates the long-period reordering processing.

At step S1632, the priority reordering processing program 426 acquires a rebuild order queue 1022 matched with the set priority level 1021 (target priority level).

At step S1633, the priority reordering processing program 426 reorders the entries (rebuild region information) in the rebuild order queue 1022 in descending order of the fixed values of long-period monitoring and terminates the long-period reordering processing.

FIG. 17 is a diagram to explain reordering a rebuild order.

First, a frequency distribution is calculated according to a result of long-period monitoring 1711. For example, as is presented in a graph 1710, a calculation is made of a distribution that is obtained by ordering fixed values of long-period monitoring calculated per page 331 in descending order.

Then, the frequency distribution is updated at a short period (e.g., a host I/O period) according to a result of short-period monitoring 1712. For example, as is presented in a graph 1720, when a fixed value of short-period monitoring acquired for a page 331 has exceeded the fixed value of long-period monitoring of the page 331, the frequency distribution is reordered based on the fixed value of short-period monitoring.

FIG. 18A is a diagram presenting an example of a setup screen (GUI) (a rebuild setup screen 1810). The rebuild setup screen 1810 is output to a predetermined device (e.g., a management node 2220 which will be described later or the like).

The rebuild setup screen 1810 is configured to enable it to set information as follows: long-period mode 1811; short-period mode 1812; priority determining algorithm 1813; monitoring fixing counter value 1814; priority ordering threshold 1815; what is monitored 1816; and priority level 1817.

Long-period mode 1811 is an item enabling it to set whether or not to execute reordering the rebuild order by fixed values of long-period monitoring. Short-period mode 1812 is an item enabling it to set whether or not to execute reordering the rebuild order by fixed values of short-period monitoring.

When short-period mode 1812 is "ON", it is enabled to set priority determining algorithm 1813, monitoring fixing counter value 1814, and priority ordering threshold 1815 as shot-period detailed setup.

Priority determining algorithm 1813 is an item enabling it to select an algorithm for determining a rebuild order (priority ordering). In the present embodiment, a case is described where "monitoring comparison mode" was selected. Note that "access order mode" will be described in a second embodiment and "piggyback mode" will be described in a third embodiment.

Monitoring fixing counter value 1814 is an item enabling it to set a monitoring fixing counter value. Priority ordering threshold 1815 is an item enabling it to set a range of pages (regions) to be reordered. For instance, in a case where IOPH "100" was set as priority ordering threshold 1815, only pages that have exceeded IOPH "100" are to be reordered.

What is monitored 1816 is an item enabling it to set IO type (Read/Write) to be monitored. By this item "what is monitored" 1816, IO type to be monitored can be set according to the characteristics of an application 351. Priority level 1817 is an item enabling it to set a priority level of automatic priority ordering control.

FIG. 18B is a diagram presenting an example of a setup screen (GUI) (a virtual volume setup screen 1820). The virtual volume setup screen 1820 is output to a predetermined device (e.g., the management node 2220 which will be described later or the like).

The virtual volume setup screen 1820 is a screen via which setup per virtual volume 330 is performed. The virtual volume setup screen 1820 is configured to enable it to set information as follows: preferential recovery 1821; starting offset 1822; size 1823; and priority level 1824.

Preferential recovery 1821 is an item enabling it to set whether or not to recover the virtual volume 330 preferentially. By this item "preferential recovery" 1821, a user can allow a preferential recovery in units of virtual volumes 330.

When preferential recovery 1821 is "ON", it is enabled to set starting offset 1822, size 1823, and priority level 1824 as detailed setup of a region to be recovered preferentially (a preferential recovery region) in the virtual volume 330. Starting offset 1822 is an item enabling it to set the staring address of a preferential recovery region. Size 1823 is an item enabling it to set the size of the preferential recovery region. Priority level is an item enabling it to set a priority level of the preferential recovery region.

The user can set an optional number of referential recovery regions, using the Add button 1825.

By setup via the virtual volume setup screen 1820, the storage system 101 can rebuild a specified virtual volume 330 preferentially.

Furthermore, it is featured that the storage system 101 preferentially rebuilds a region or regions specified by the user in the virtual volume 330.

Furthermore, the storage system 101 allows the user to set an attribute of preferential recovery for an optional region in an optional virtual volume 330.

Furthermore, it is featured that the storage system 101 has multiple priority levels for determining the order of recovering physical segments suffering from failure and rebuilds these segments in order, beginning with a region having the highest priority level.

Furthermore, the storage system 101 allows the user to set an attribute of preferential recovery for optional regions in respective optional virtual volumes 330 and set an optional priority level for these settings.

Furthermore, it is featured that the storage system 101 allows the user to set a priority level for rebuild processing that the storage system 101 sets up automatically and the storage system compares a priority level that is set automatically by the storage system 101 and a user-specified priority level and executes rebuilding, beginning with a higher priority region.

According to the present embodiment, it is possible to provide a highly reliable storage system 101.

(2) Second Embodiment

While the case where "monitoring comparison mode" was selected as the priority determining algorithm 1813 was described in the first embodiment, a case where "access order mode" was selected is described in the present embodiment. In the present embodiment, when latest access has occurred to one of regions having the same priority level band, reordering the regions is performed so that the latest accessed region has the highest priority. Therefore, when access to a region has occurred even once, the entry of the region is moved to the beginning of the rebuild order queue.

In the present embodiment, description focuses on a configuration that differs from the first embodiment (short-period monitoring fixing processing and short-period reordering processing).

Figure 19A:
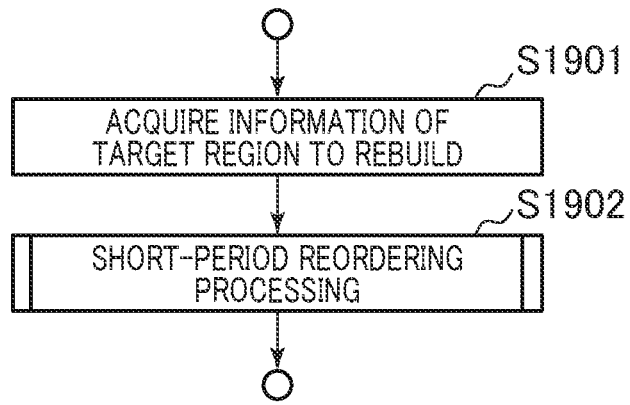
FIG. 19A is a diagram illustrating an example of a flowchart about short-period monitoring fixing processing according to a second embodiment.

FIG. 19A is a diagram illustrating an example of a flowchart about short-period monitoring fixing processing.

At step S1901, the monitor processing program 424 acquires information (a site number, a node number, a drive number, offset, etc.) of a target region to rebuild to which a physical segment belongs. The physical segment has been accessed by a read processing request or a write processing request.

Figure 19B:
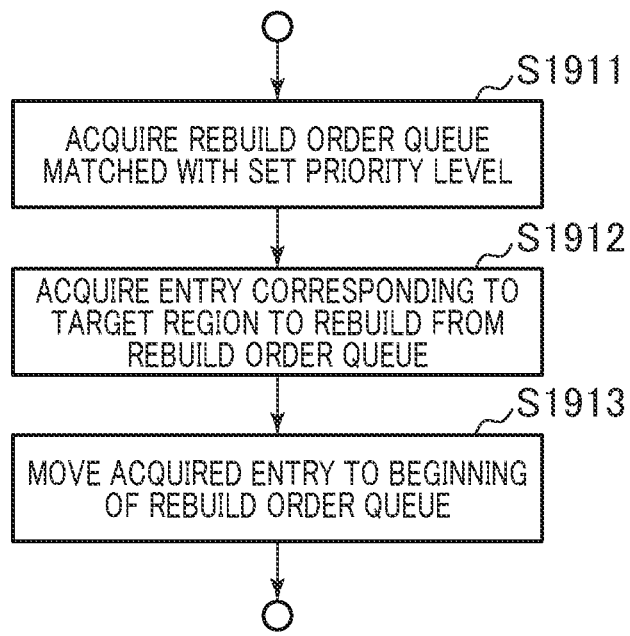
FIG. 19B is a diagram illustrating an example of a flowchart about short-period reordering processing according to the second embodiment.

At step S1902, the monitor processing program 424 performs short-period reordering processing as illustrated in FIG. 19B and terminates the short-period monitoring fixing processing.

FIG. 19B is a diagram illustrating an example of a flowchart about short-period reordering processing.

At step S1911, the monitor processing program 424 acquires a rebuild order queue 1022 matched with the set priority level (target priority level.

At step S1912, the monitor processing program 424 acquires an entry (rebuild region information) corresponding to the target region to rebuild from the rebuild order queue 1022.

At step S1913, the monitor processing program 424 moves the acquired entry to the beginning of the rebuild order queue 1022 and terminates the short-period reordering processing.

According to the present embodiment, it is possible to make an accessed physical segment have the highest priority of rebuild ordering regardless of access frequency.

(3) Third Embodiment

While the case where "monitoring comparison mode" was selected as the priority determining algorithm 1813 was described in the first embodiment, a case where "piggyback mode" was selected is described in the present embodiment. In the present embodiment, a target region to rebuild including a physical segment that has been accessed as extension of host I/O processing (read processing or write processing) is recovered.

In the present embodiment, description focuses on a configuration that differs from the first embodiment (read processing and write processing).

In the storage system 101 of the present embodiment, when "piggyback mode" has been selected as the priority determining algorithm 1813, the ongoing read processing or write processing is switched to read processing or write processing of the present embodiment. However, a requirement of "piggyback mode" running is that rebuilding has already started. Before the start of rebuilding, read processing or write processing of the first embodiment is performed.

When accessing a failed portion whose size is not equal to a rebuild management unit, the storage system 101 expands a region to access to the rebuild management unit and accesses the region. Then, after sending a reply to the application 351, the storage system 101 writes data repaired at the time of access to a destination to store rebuilt data and updates rebuild progress information.

Figure 20:
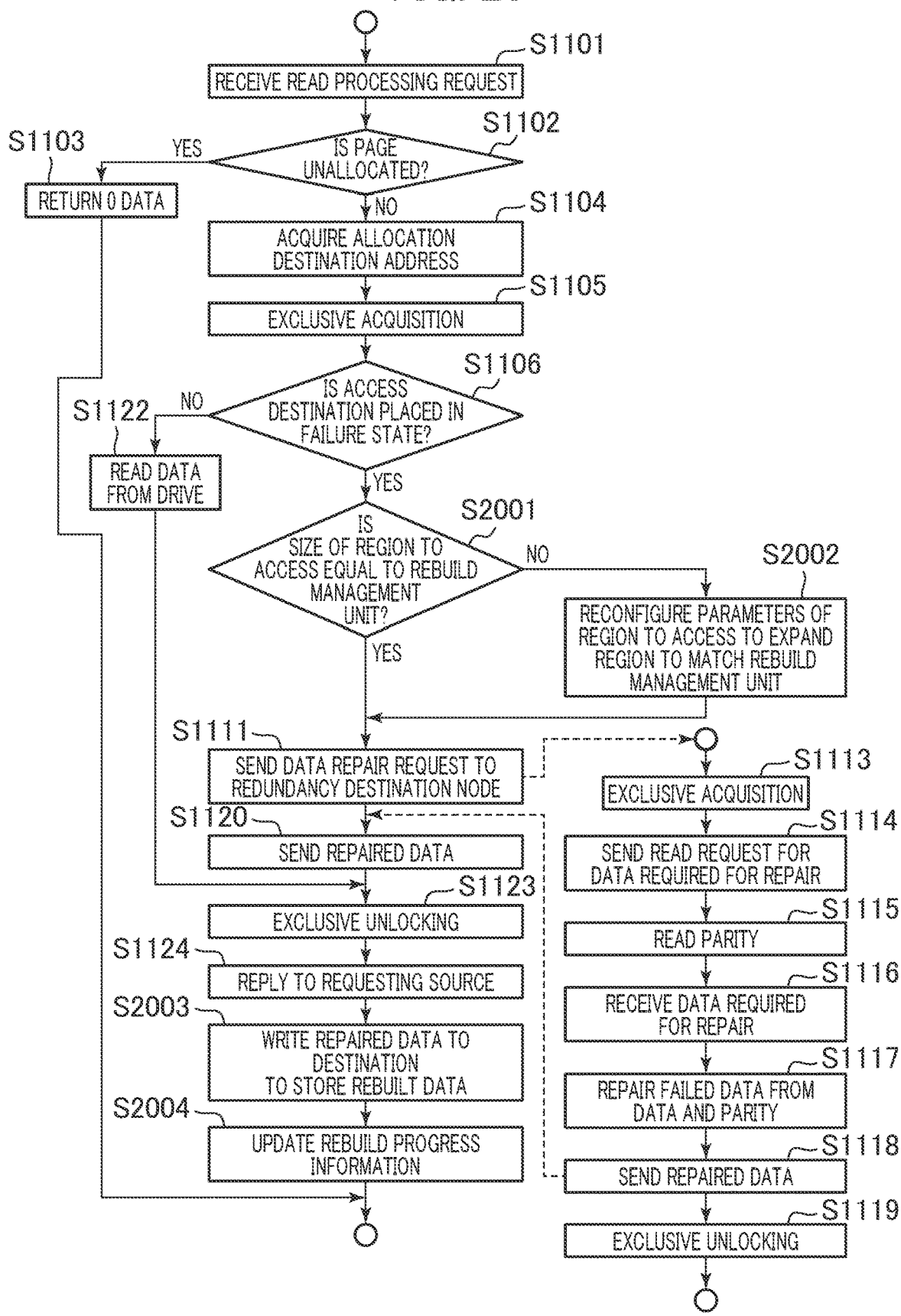
FIG. 20 is a diagram illustrating an example of a flowchart about read processing according to the second embodiment.

FIG. 20 is a diagram illustrating an example of a flowchart about read processing. Processing steps that are the same as in read processing of the first embodiment are assigned the same reference numbers and omitted from the following description.

At step S2001, the read processing program 421 decides whether or not the size of a region to access is equal to a rebuild management unit.

If having decided that the size of a region to access is not equal to a rebuild management unit, the read processing program 421 reconfigures parameters of the region to access to expand the region to match the rebuild management unit (step S2002). The read processing program 421 returns data as a reply to the requesting source at step S1124. At this time, the read processing program 421 returns only a block or blocks as requested by the requesting source within the repaired data read from the region expanded to the rebuild management unit.

At step S2003, the read processing program 421 writes the repaired data to the destination to store rebuilt data.

At step S2004, the read processing program 421 updates the rebuild progress information 1014.

Figure 21:
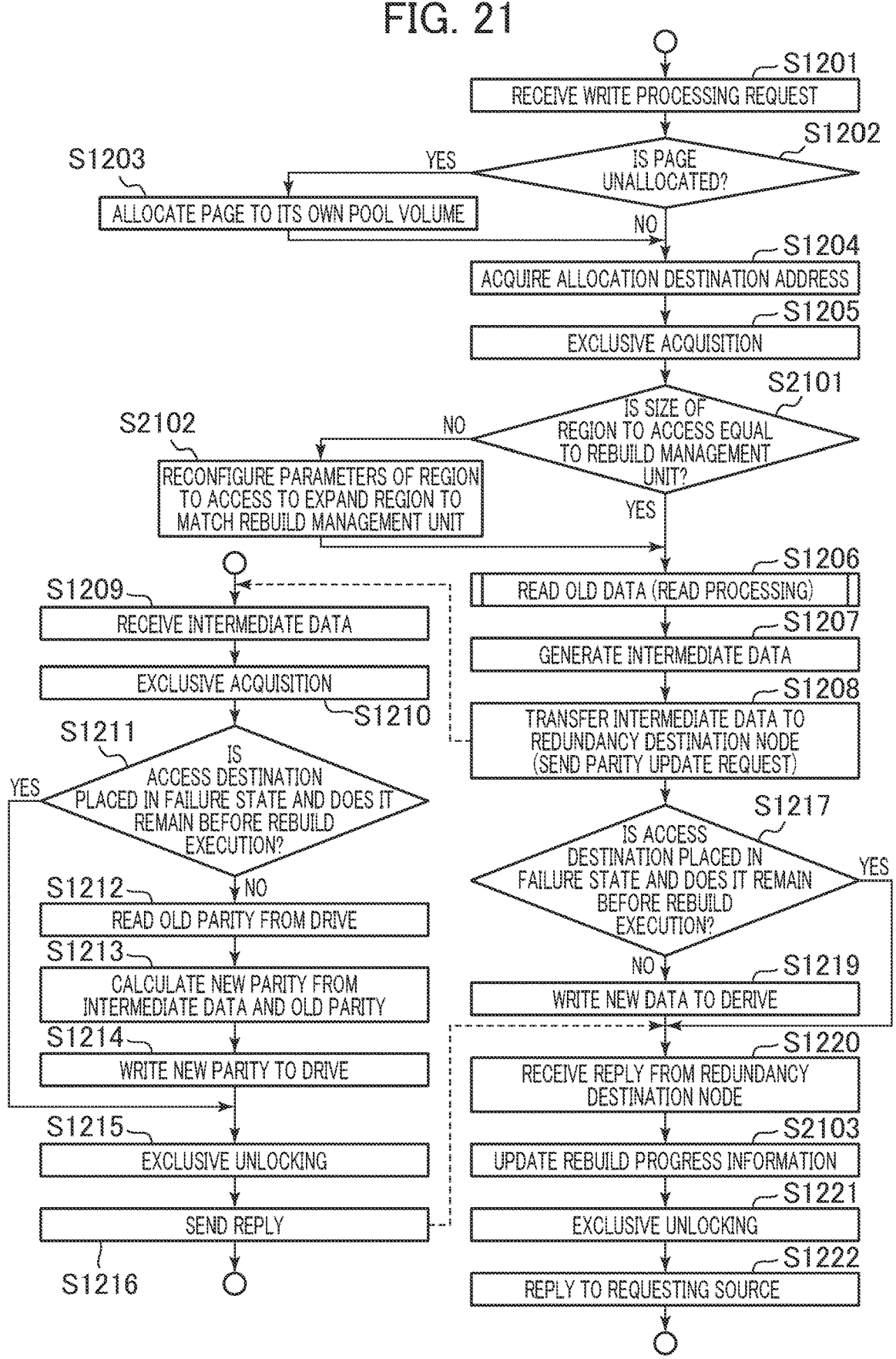
FIG. 21 is a diagram illustrating an example of a flowchart about write processing according to a third embodiment.

FIG. 21 is a diagram illustrating an example of a flowchart about write processing. Processing steps that are the same as in write processing of the first embodiment are assigned the same reference numbers and omitted from the following description.

At step S2101, the write processing program 422 decides whether or not the size of a region to access is equal to a rebuild management unit.

If having decided that the size of a region to access is not equal to a rebuild management unit, the write processing program 422 reconfigures parameters of the region to access to expand the region to match the rebuild management unit (step S2102).

At step S2103, the write processing program 422 updates the rebuild progress information 1014.

According to the present embodiment, it is possible to execute rebuilding efficiently by executing rebuilding as extension of host I/O processing, while executing rebuilding in a predetermined order.

(4) Forth Embodiment

In the present embodiment, a case is described where re-determining rebuild ordering is applied to a shared-type storage system. In the present embodiment, description focuses on a configuration that differs from the first embodiment.

Figure 22:
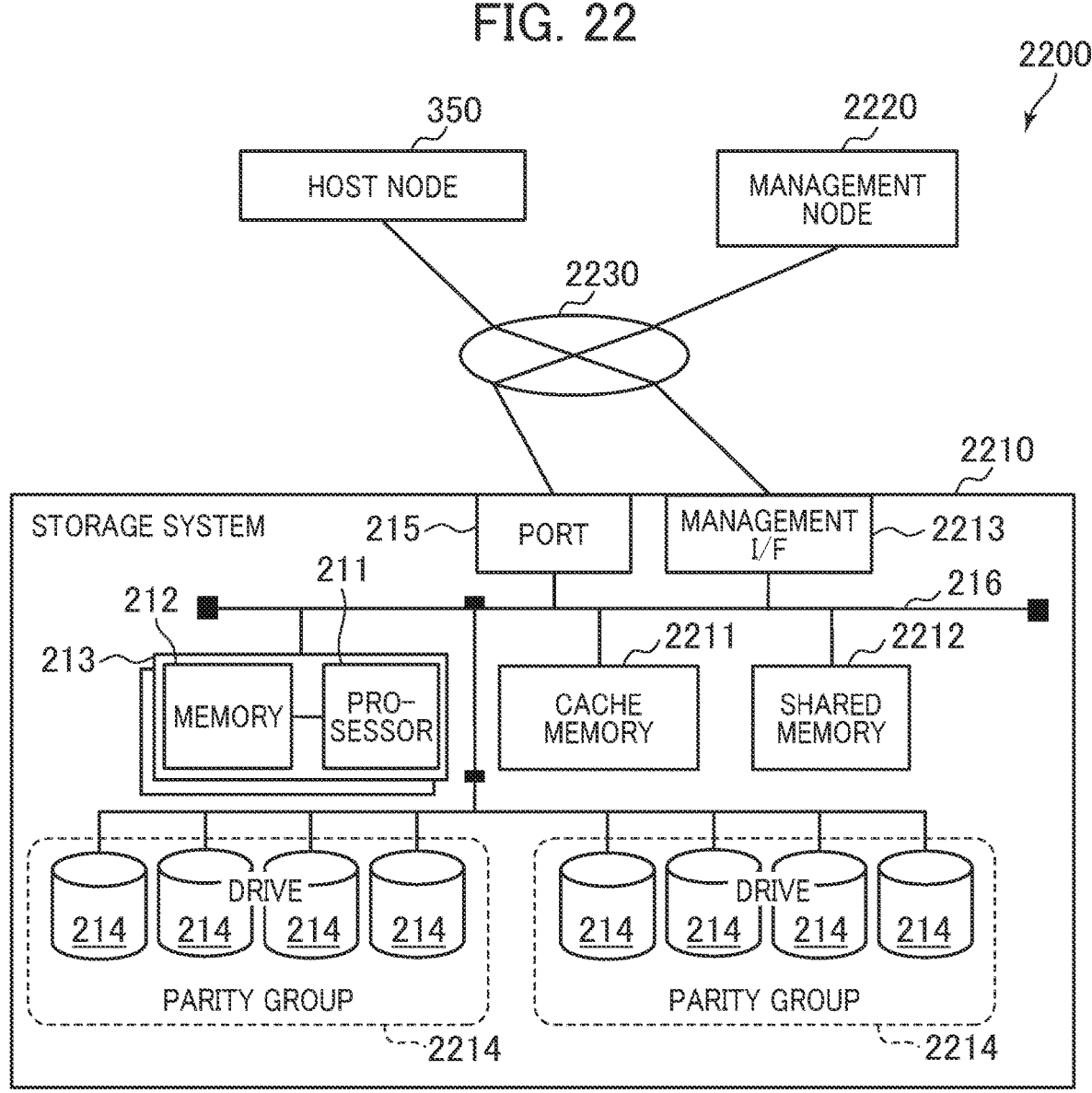
FIG. 22 is a diagram depicting an example of a configuration regarding a computer system according to a fourth embodiment.

FIG. 22 is a diagram depicting an example of a configuration regarding a computer system 2200 of the present embodiment. Components that are the same as in the first embodiment are identified with the same reference numbers and omitted from the following description.

The computer system 2200 is configured including a storage system 2210, a management node 2220, and a host node 350. The storage system 2210, management node 2220, and host node 350 are connected so that they can communicate with each other via a network 2230. Note that the network 2230 is configured using a Storage Area Network (SAN), Ethernet, etc.

The storage system 2210 is configured including one or more processor packages 213 that each include a processor 211, a memory 212, etc., one or more drives 214, one or more ports 215, a cache memory 2211, a shared memory 2212, and a management I/F 2213. Every component is interconnected via an internal bus 216.

The cache memory 2211 is a more quickly accessible memory for storing data as temporary cached data to improve, inter alia, throughput and response of I/O processing of the storage system 2210.

The shared memory 2212 is a memory to store information for control necessary for the processor 211 to process a read instruction, a write instruction, etc. and execute functions of the storage (such as a function of copying a virtual volume 330). Also, the shared memory 2212 is a memory to store information that is shared by the processors 211 of multiple processor packages 213.

The management I/F 2213 is connected to the network 2230 to enable communication with the management node 2200.

In the storage system 2210, multiple drives 214 are used and a parity group 2214 is formed to protect data from failure.

The management node 2220 is connected to the management I/F 2213 or a port 215 of the storage system 2210 via the network 2230. Using the management node 2220, a storage manager sends, inter alia, various settings and managerial instructions necessary for running the storage system 2210.

Figure 23:
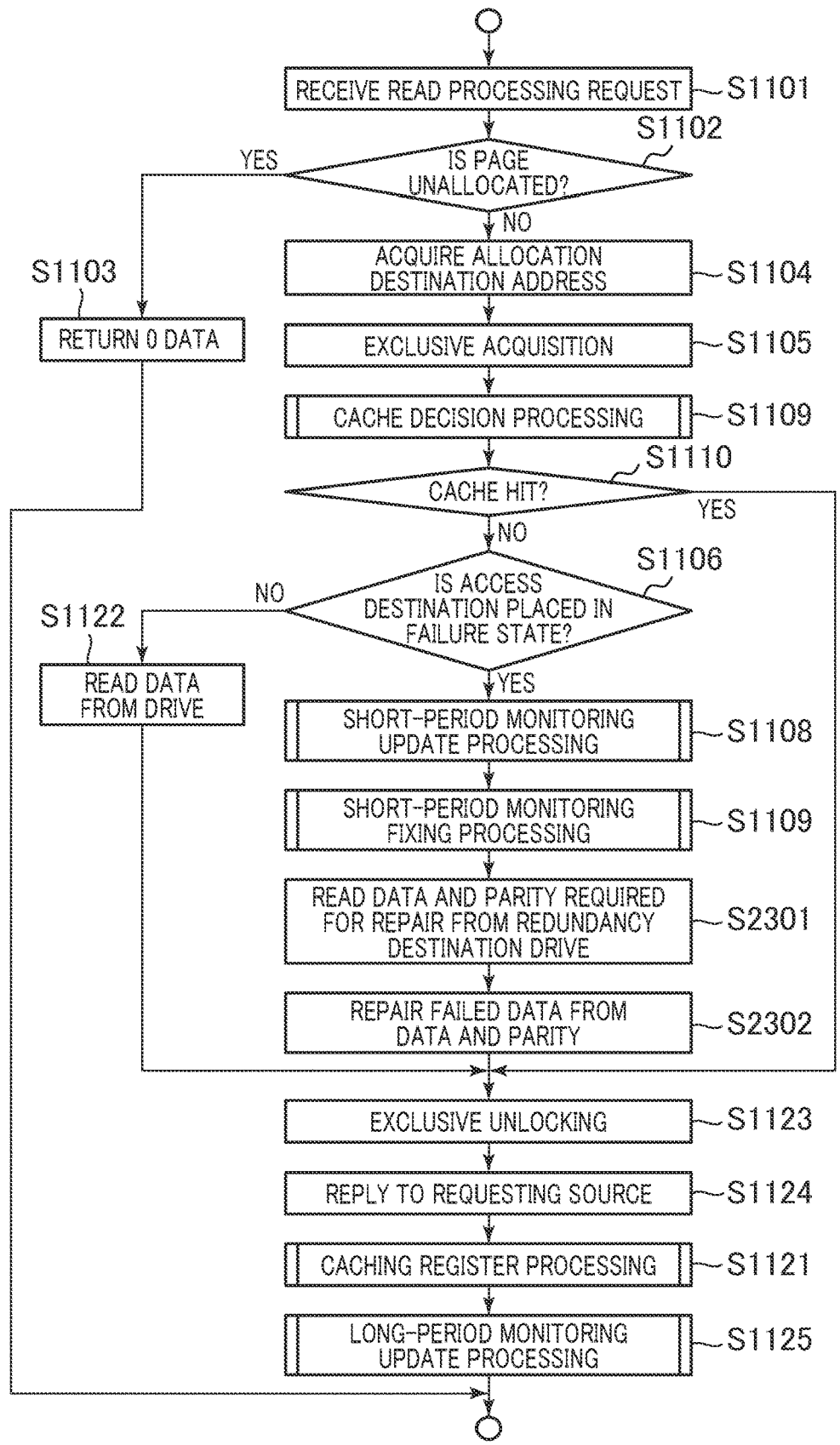
FIG. 23 is a diagram illustrating an example of a flowchart about read processing according to the fourth embodiment.

FIG. 23 is a diagram illustrating an example of a flowchart about read processing. Processing steps that are the same as in read processing of the first embodiment are assigned the same reference numbers and omitted from the following description.

At step S2301, the read processing program 42 reads data and parity required for repair from a redundancy destination drive 214.

At step S2302, the read processing program 421 repairs failed data from the read data and parity (generates repaired data).

Note that, in read processing of the present embodiment, because cache control works even when in normal operation, cache decision processing is executed regardless of whether a failure state exists. Consequently, read throughput and response performance can be enhanced. Besides, in the present storage system 2210, the cache memory 2211 or drives (omitted from depiction) that perform at higher speed than the drives 214 for storing data are used to provide cache segments 301.

Figure 24A:
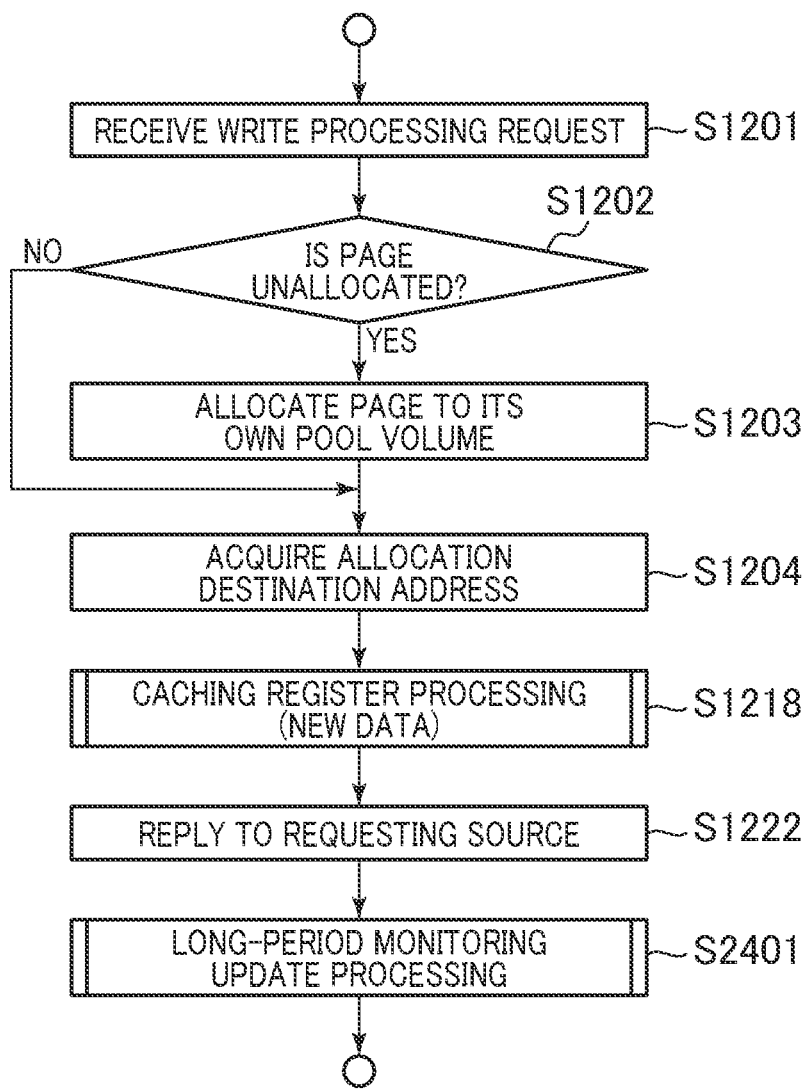
FIG. 24A is a diagram illustrating an example of a flowchart about front-end write processing according to the fourth embodiment.

FIG. 24A is a diagram illustrating an example of a flowchart about front-end write processing. Processing steps that are the same as in write processing of the first embodiment are assigned the same reference numbers and omitted from the following description.

In front-end write processing, through the execution of processing in steps S1201 thru S204 and in steps S1218 and S1222, eventually, data to write is cached into the cache memory 2211 and a reply is returned to the requesting source. In addition, at step S2401, the write processing program 422 instructs the cache processing program 423 to perform long-period monitoring update processing for the target page 331 to write and terminates the front-end write processing.

Figure 24B:
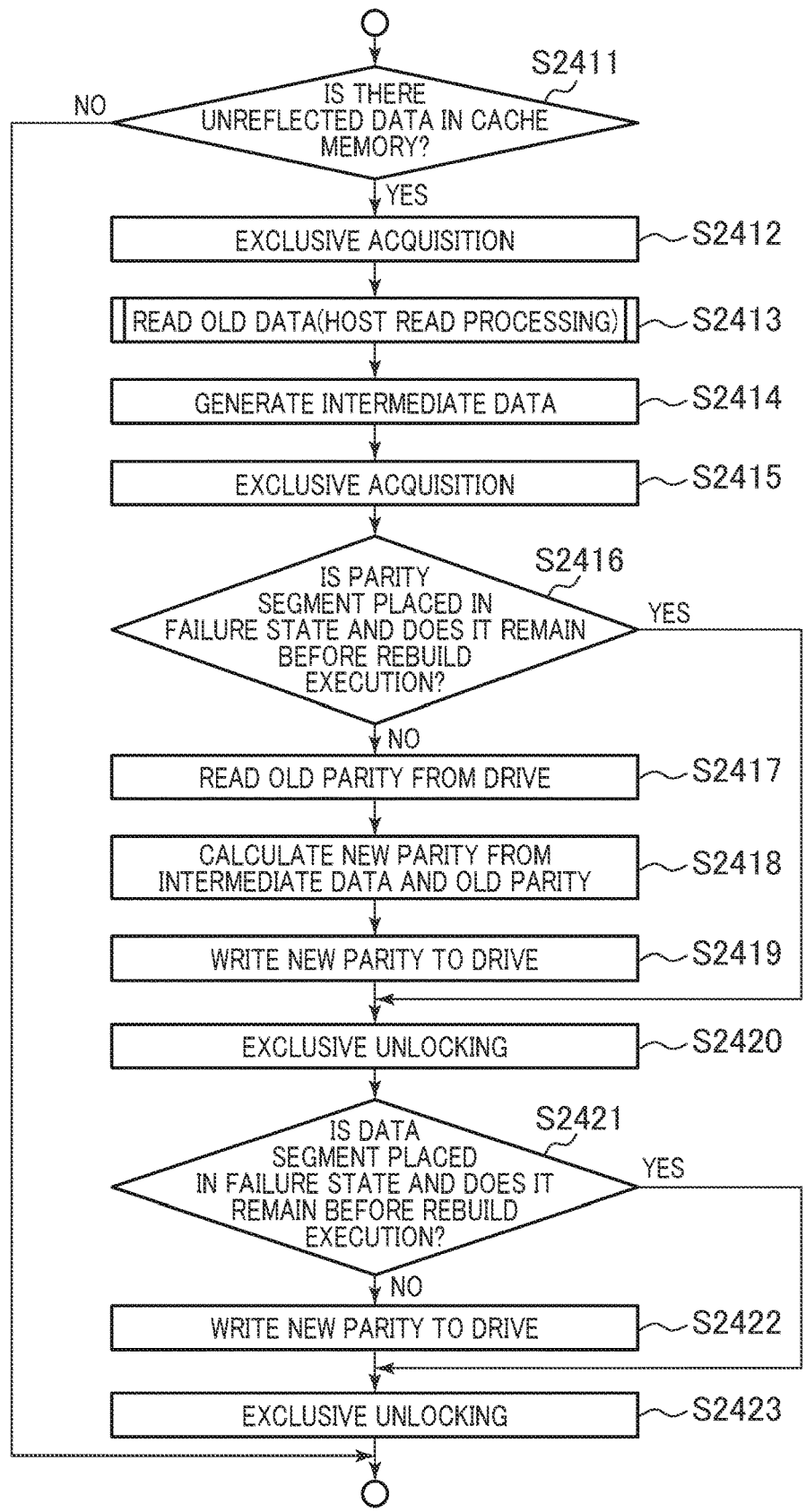
FIG. 24B is a diagram illustrating an example of a flowchart about back-end write processing according to the fourth embodiment.

FIG. 24B is a diagram illustrating an example of a flowchart about back-end write processing. Back-end write processing is executed when data unreflected in a drive 214 exists in the cache memory 2211 and the unreflected data is written to a drive 214.

At step S2411, the write processing program 422 decides whether or not there is unreflected data in the cache memory 2211. If having decided that there is unreflected data in the cache memory 2211, the write processing program 422 moves processing to step S2412; if having decided that there is not unreflected data in the cache memory 2211, it terminates the back-end write processing.

At step S2412, the write processing program 422 performs exclusive acquisition.

At step S2413, the write processing program 422 reads data before write (old data) (more specifically, read processing as in FIG. 11 is performed for the old data).

At step S2414, the write processing program 422 generates intermediate data.

At step S2415, the write processing program 422 performs exclusive acquisition.

At step S2146, the write processing program 422 decides whether or not a physical segment with parity being stored therein (a parity segment) is placed in a failure state and remains before rebuild execution. If having decided that the parity segment is placed in a failure state and remains before rebuild execution, the write processing program 422 moves processing to step S2420; if having decided that the parity segment is not placed in a failure state or does not remain before rebuild execution, it moves processing to step S2417.

At step S2417, the write processing program 422 reads old parity from a drive 214.

At step S2418, the write processing program 422 calculates new parity from the intermediate data and the old parity.

At step S2419, the write processing program 422 writes the new parity to the drive 214.

At step S2420, the write processing program 422 performs exclusive unlocking.

At step S2421, the write processing program 422 decides whether or not a physical segment with data being stored therein (a data segment) is placed in a failure state and remains before rebuild execution. If having decided that the data segment is placed in a failure state and remains before rebuild execution, the write processing program 422 moves processing to step S2423; if having decided that the data segment is not placed in a failure state or does not remain before rebuild execution, it moves processing to step S2422.

At step S2422, the write processing program 422 writes new data to the drive 214.

At step S2423, the write processing program 422 performs exclusive unlocking and terminates the back-end write processing.

According to the present embodiment, because cache control is executed independently of the state of physical segments, read throughput and response performance can be enhanced.

(5) Other Embodiments

The foregoing described embodiments assume a case where the present invention is applied to a storage system. However, the invention is not so limited and is widely applicable to other various systems, devices, methods, programs, and recording media in which programs are recorded.

Besides, in the case described in the foregoing embodiments, the target regions to rebuild are reordered in the step S1625. However, the present invention is not so limited and, alternatively, all entries a rebuild order queue 1022 acquired in the step S1624 may be reordered. In this case, comparison is made between a fixed value of short-period monitoring and a fixed value of long-period monitoring and a high value may be taken as the frequency of access to each entry.

Besides, in the case described in the foregoing embodiments, the monitor processing program 424 monitors access in units of pages 331. However, the present invention is not so limited and, alternatively, the monitor processing program 424 may monitor access in other units, such as units of nodes 210, drives 214, physical chunks 311, rebuild management units, or data pieces corresponding to data for which access is requested.

Besides, in the foregoing embodiments, the structure of each of the tables is one example; one table may be divided into two or more tables and all or part of two or more tables may form one table.

Besides, in the foregoing embodiments, diverse sets of data were explained using XX tables for convenience of explanation. However, data structures are not restrictive and may be expressed as XX information or others.

Information such as programs implementing the respective functions, tables, and files can be placed in a storage device such as a memory, hard disk, and SSD (Solid State Drive) or a recording medium such as an IC card, SD card, and DVD.

The foregoing embodiments have, for example, characteristic configurations as described below.

A storage system (e.g., a storage system 101) adapted to perform rebuilding may include multiple storage devices (e.g. drives 214) to store data and a controller (e.g., a processor 211 or a processor package 213) to process data that is input to or output from the storage devices. When failure has occurred in one of the storage devices, the controller may repair data stored in a storage device in which the failure has occurred, based on data and redundant data stored in other multiple storage devices. The controller may repair data (e.g., a page 331) for which an access request (e.g., inter alia, a read processing request or a write processing request) has been issued, return a reply to the source of the access request, and store the repaired data. As regards data for which access is not requested, the controller may execute rebuilding of storage regions corresponding to rebuild management units in priority-based order and change priority for executing the rebuilding based on access frequencies for a first period (e.g., fixed values of access frequency 915) and access frequencies for a second period that is shorter than the first period (e.g., fixed values of access frequency 926).

In the above configuration, because priority for executing rebuilding is changed based on access frequencies for a first period and access frequencies for a second period that is shorter than the first period, it is possible to, e.g., change rebuild ordering in response to an unexpected change occurring in I/O processing operations and execute rebuilding. By thus changing rebuild ordering, it is possible to avoid a situation where the storage system performance decreases because of improper rebuild ordering.

The above-mentioned first period may include a period before start of the rebuilding (for instance, long-period monitoring update processing is performed and the access counter is updated regardless of whether or not the access destination is placed in a failure state). The above-mentioned second period may be a period after start of the rebuilding (for instance, short-period monitoring update processing is performed and the access counter is updated when the access destination is placed in a failure state).

Order of the rebuilding may be determined based on access frequencies for the first period and order of the rebuilding may be changed if an access frequency for the second period has exceeded a predetermined value (for instance, long-period monitoring fixing processing (long-period reordering processing) is performed during rebuild order initializing processing or short-period monitoring fixing processing (short-period reordering processing) is performed when failure exists).

The controller may store the repaired data into a cache segment (e.g., a cache segment 301). Upon having received an access request, the controller may search cache segments for data and execute repairing the data if the data has not been found. Access frequencies for the second period may be obtained as a result of monitoring access to data pieces in the cache segments.

According to the above configuration, upon having received an access request, the controller searches cache segments for data; therefore, it is possible, e.g., to enhance read throughput and response performance.

Upon having received an access request, the controller may repair a data piece of the access request received as well as data pieces in a storage region corresponding to the same rebuild management unit including the data piece (for instance, read processing illustrated in FIG. 20 and write processing illustrated in FIG. 21).

In the above configuration, because a data piece of the access request received as well as data pieces in a storage region corresponding to the same rebuild management unit including the data piece, it is possible to execute rebuilding efficiently. Also, in the above configuration, the number of times in which data pieces in a storage region corresponding to a rebuild management unit are repaired and written to a device is decreased; therefore, it is possible, e.g., to avoid a situation where the storage system performance decreases.

The storage system may include the above-mentioned storage devices, the above-mentioned controller, and nodes (e.g., a node 210) interconnected via a network (e.g., a network 202 or a network 220). Multiple pieces of data and redundant data for repairing the data may be stored in storage devices on at least two or more nodes. Failure in one of the storage devices may be failure on a node. When failure has occurred in one of the nodes, the controller on a node that is free from failure may collect pieces of data and redundant data from multiple nodes and perform data repair.

As for the above-described configurations, their components may be changed, rearranged, combined, or deleted, as appropriate, without departing from the gist of the present invention.

What is claimed is:

1. A storage system adapted to perform rebuilding, comprising multiple storage devices to store data and a controller to process data that is input to or output from the storage devices,
   wherein, when failure has occurred in one of the storage devices, the controller repairs data stored in a storage device in which the failure has occurred, based on data and redundant data stored in other multiple storage devices
   wherein:
   the controller repairs data for which an access request has been issued, returns a reply to a source of the access request, and stores the repaired data;
   as regards to data for which access is not requested, the controller executes rebuilding of storage regions corresponding to rebuild management units in priority-based order; and
   the controller changes priority for executing the rebuilding, based on access frequencies for a first period and access frequencies for a second period that is shorter than the first period,
   wherein:
   the controller stores the repaired data into a cache segment;
   upon having received an access request, the controller searches cache segments for data and executes repairing the data if the data has not been found; and
   access frequencies for the second period are obtained as a result of monitoring access to data pieces in the cache segments.

2. The storage system according to claim 1,
   wherein:
   the first period includes a period before start of the rebuilding; and
   the second period is a period after start of the rebuilding.

3. The storage system according to claim 2,
   wherein:
   order of the rebuilding is determined based on access frequencies for the first period; and
   order of the rebuilding is changed if an access frequency for the second period has exceeded a predetermined value.

4. The storage system according to claim 1,
   wherein, upon having received an access request, the controller repairs a data piece of the access request received as well as data pieces in a storage region corresponding to the same rebuild management unit including the data piece.

5. The storage system according to claim 1, comprising the storage devices, the controller, and nodes interconnected via a network,
   wherein:
   multiple pieces of data and redundant data for repairing the data are stored in storage devices on at least two or more nodes;
   failure in one of the storage devices is failure on a node;
   when failure has occurred in one of the nodes, the controller on a node that is free from failure collects pieces of data and redundant form multiple nodes and performs data repair.

6. A data processing method for use in a storage device adapted to perform rebuilding, comprising multiple storage devices to store data and a controller to process data that is input to or output from the storage devices,
   wherein, when failure has occurred in one of the storage devices, the controller repairs data stored in a storage device in which the failure has occurred, based on data and redundant data stored in other multiple storage devices,
   wherein:
   the controller repairs data for which an access request has been issued, returns a reply to a source of the access request, and stores the repaired data;
   as regards to data for which access is not requested, the controller executes rebuilding of storage regions corresponding to rebuild management units in priority-based order; and
   the controller changes priority for executing the rebuilding, based on access frequencies for a first period and access frequencies for a second period that is shorter than the first period,
   wherein:
   the controller stores the repaired data into a cache segment;
   upon having received an access request, the controller searches cache segments for data and executes repairing the data if the data has not been found; and
   access frequencies for the second period are obtained as a result of monitoring access to data pieces in the cache segments.

* * * * *